(12) United States Patent
Limberg

(10) Patent No.: US 6,480,236 B1
(45) Date of Patent: Nov. 12, 2002

(54) ENVELOPE DETECTION OF PN SEQUENCES ACCOMPANYING VSB SIGNAL TO CONTROL OPERATION OF QAM/VSB DTV RECEIVER

(75) Inventor: Allen LeRoy Limberg, Vienna, VA (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/285,241

(22) Filed: Apr. 2, 1999

Related U.S. Application Data

(60) Provisional application No. 60/080,472, filed on Apr. 2, 1998, and provisional application No. 60/121,930, filed on Feb. 26, 1999.

(51) Int. Cl.[7] ................................................. H04N 5/44
(52) U.S. Cl. ........................ 348/555; 348/614; 348/471; 348/725
(58) Field of Search ................................. 348/555, 614, 348/725, 726, 471, 472, 558; 375/346, 348, 350; H04N 5/44, 5/21

(56) References Cited

U.S. PATENT DOCUMENTS 6,188,441 B1 * 2/2001 Limberg ..................... 348/553

* cited by examiner

Primary Examiner—David E. Harvey
(74) Attorney, Agent, or Firm—Sughrue Mion, PLLC

(57) ABSTRACT

The data field synchronization segment as symbol coded for VSB transmission comprises pseudo-random noise (PN) sequence information that can be detected in a QAM/VSB DTV signal receiver using an envelope detector responsive to final intermediate-frequency signal and a match filter for responsive to the PN sequence information appearing in the envelope detector response. The envelope detector response to QAM transmission does not contain the PN sequence information detected by the match filter. A threshold detector is used for determining whether the match filter response is of sufficient energy to indicate occurrence in a received DTV signal of the PN sequence information in the data field synchronization segment of a VSB DTV transmission. Timed latch circuitry is used for latching the indication for a period of time longer than at least one DTV data field. The QAM/VSB DTV signal receiver is operated either in a QAM reception mode or in a VSB reception mode, depending on the output signal of the timed latch circuitry.

20 Claims, 16 Drawing Sheets

ENVELOPE DETECTION OF PN SEQUENCES ACCOMPANYING VSB SIGNAL TO CONTROL OPERATION OF QAM/VSB DTV RECEIVER

This application is filed under 35 U.S.C. 111 (a) claiming pursuant to 35 U.S.C. 1.19(e)(1) benefit of the filing date of provisional application Ser. No. 60/080,472 filed Apr. 2, 1998, pursuant to 35 U.S.C. 111 (b), and benefit of the filing date of provisional application Ser. No. 60/121,930 filed Feb. 26, 1999, pursuant to 35 U.S.C. 111 (b).

The invention relates to radio receivers having the capability of receiving digital television (DTV) signals such as digital high-definition television (HDTV) signals, transmitted using quadrature amplitude modulation (QAM) of the principal carrier wave or transmitted using vestigial sideband (VSB) amplitude modulation of the principal carrier wave.

BACKGROUND OF THE INVENTION

A Digital Television Standard published Sep. 16, 1995 by the Advanced Television Systems Committee (ATSC) specifies vestigial sideband (VSB) signals for transmitting digital television (DTV) signals in 6-MHz-bandwidth television channels such as those currently used in over-the-air broadcasting of National Television System Committee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal. These odd multiples fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 Hz from the lower limit frequency of the television channel. Accordingly, the carrier of the DTV signal is about 2,690122.4 Hz from the middle frequency of the television channel. The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is $10.762238*10^6$ symbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV format uses 1920 samples per scan line and 1080 active horizontal scan lines per 30 Hz frame with 2:1 field interlace. The other HDTV format uses 1280 luminance samples per scan line and 720 progressively scanned scan lines of television image per 60 Hz frame. The ATSC standard also accommodates the transmission of DTV formats other than HDTV formats, such as the parallel transmission of four television signals having normal definition in comparison to an NTSC analog television signal.

DTV transmitted by vestigial-sideband (VSB) amplitude modulation (AM) for terrestrial broadcasting in the United States of America comprises a succession of consecutive-in-time data fields each containing 313 consecutive-in-time data segments. There are 832 symbols per data segment. So, with the symbol rate being 10.76 MHz, each data segment is of 77.3 microseconds duration. Each segment of data begins with a line synchronization code group of four symbols having successive values of +S, –S, –S and +S. The value +S is one level below the maximum positive data excursion, and the value –S is one level above the maximum negative data excursion. The initial line of each data field includes a field synchronization code group that codes a training signal for channel-equalization and multipath suppression procedures. The training signal is a 511-sample pseudo-noise sequence (or "PN-sequence") followed by three 63-sample PN sequences. The middle one of these 63-sample PN sequences is transmitted in accordance with a first logic convention in the first line of each odd-numbered data field and in accordance with a second logic convention in the first line of each even-numbered data field, the first and second logic conventions being one's complementary respective to each other. The other two 63-sample PN sequences and the 511-sample PN sequence are transmitted in accordance with the same logic convention in all data fields.

The remaining lines of each data field contain data that have been Reed-Solomon forward error-correction coded. In over-the-air broadcasting the error-correction coded data are then trellis coded using twelve interleaved trellis codes, each a 2/3 rate punctured trellis code with one uncoded bit. Trellis coding results are parsed into three-bit groups for over-the-air transmission in eight-level symbol coding having a one-dimensional-constellation, which transmission is made without symbol pre-coding separate from the trellis coding procedure. Trellis coding is not used in cablecasting proposed in the ATSC standard. The error-correction coded data are parsed into four-bit groups for transmission as sixteen-level symbol coding having a one-dimensional-constellation, which transmissions are made without pre-coding.

The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 3-bit symbol coding have normalized values of –7, –5, –3, –1, +1, +3, +5 and +7 in the carrier modulating signal, the pilot carrier has a normalized value of 1.25. The normalized value of +S is +5, and the normalized value of -S is –5.

VSB signals using 8-level symbol coding will be used in over-the-air broadcasting within the United States, and VSB signals using 16-level symbol coding can be used in over-the-air narrowcasting systems or in cable-casting systems. However, certain cable-casting is likely to be done using suppressed-carrier quadrature amplitude modulation (QAM) signals instead, rather than using VSB signals. This has presented television receiver designers with the challenge of designing receivers that are capable of receiving either type of transmission and of automatically selecting suitable receiving apparatus for the type of transmission currently being received.

It is assumed that the data format supplied for symbol encoding is the same in transmitters for the VSB DTV signals and in transmitters for the QAM DTV signals. The VSB DTV signals modulate the amplitude of only one phase of the carrier at symbol rate of $10.76*10^6$ symbols per second to provide a real signal unaccompanied by an imaginary signal, which real signal fits within a 6 MHz band because of its VSB nature with carrier near edge of band. Accordingly, the QAM DTV signals, which modulate two orthogonal phases of the carrier to provide a complex signal comprising a real signal and an imaginary signal as components thereof, are designed to have a symbol rate of $5.38*10^6$ symbols per second, which complex signal fits within a 6 MHz band because of its QAM nature, with carrier at middle of band.

Processing after symbol decoding is similar in receivers for the VSB DTV signals and in receivers for the QAM DTV signals, assuming the data format supplied for symbol encoding is the same in transmitters for the VSB DTV signals and in transmitters for the QAM DTV signals. The data recovered by symbol decoding including trellis decoding are supplied as input signal to a data de-interleaver, and the de-interleaved data are supplied to a Reed-Solomon decoder. Error-corrected data are supplied to a data de-randomizer which regenerates packets of data for a packet decoder. Selected packets are used to reproduce the audio portions of the DTV program, and other selected packets are used to reproduce the video portions of the DTV program.

The design of receivers for both QAM and VSB signals in which QAM/VSB receivers both types of signal are processed through the same intermediate-frequency amplifiers is described by C. B. Patel et alii in U.S. Pat. No. 5,715,012 issued Feb. 3, 1998, entitled "RADIO RECEIVERS FOR RECEIVING BOTH VSB AND QAM DIGITAL HDTV SIGNALS". In a DTV signal receiver as described in U.S. Pat. No. 5,715,012, the presence or absence of VSB pilot carrier in received DTV signal is detected by a pilot-carrier-presence detector in order to generate a QAM/VSB control signal for determining whether the receiver is to be conditioned for operation in a QAM signal reception mode or is to be conditioned for operation in a VSB signal reception mode. During QAM reception there are frequency components 310 kHz from the lower limit frequency of the television channel arising from amplitude modulation of the mid-channel carrier by symbol code description of data, which frequency components fluctuate as to strength. During VSB reception a pilot carrier is transmitted 310 kHz from the lower limit frequency of the television channel, which pilot carrier is supposed to be of constant strength. So long as the pilot carrier received during VSB reception is of constant strength, it can be distinguished from lower-sideband QAM signal modulation of similar frequency. However, during rapidly changing multipath conditions the pilot carrier received during VSB reception may vary in strength sufficiently to make the presence or absence of VSB pilot carrier in received DTV signal difficult or impossible to ascertain.

C. B. Patel et alii describe an alternative method for generating QAM/VSB control signal in U.S. Pat. No. 5,506,636 issued Apr. 9, 1996, entitled "HDTV SIGNAL RECEIVER WITH IMAGINARY-SAMPLE-PRESENCE DETECTOR FOR QAM/VSB MODE SELECTION". In this alternative method the absence of low-modulating-frequency components in quadrature with the pilot carrier frequency is used to determine that VSB signal is being received. The satisfactory operation of the imaginary-sample-presence detector of U.S. Pat. No. 5,506,636 depends on lack of co-channel interfering signal.

In the QAM/VSB radio receivers described in U.S. Pat. Nos. 5,506,636 and 5,715,012 the final intermediate-frequency signal is digitized, and synchrodyne procedures to obtain baseband samples are carried out in the digital regime. A tuner within the receiver includes elements for selecting one of channels at different locations in a frequency band used for transmitting DTV signals, a succession of mixers for performing a plural conversion of signal received in the selected channel to a final intermediate-frequency (IF) signal, a respective frequency-selective amplifier between each earlier one of the mixers in that succession and each next one of said mixers in that succession, and a respective local oscillator for supplying oscillations to each of the mixers. Each of these local oscillators supplies respective oscillations of substantially the same frequency irrespective of whether the selected DTV signal is a QAM signal or is a VSB signal. The final IF signal is digitized, and thereafter there are differences in signal processing depending on whether the selected DTV signal is a QAM signal or is a VSB signal. These differences are accommodated in digital circuitry including QAM synchrodyning circuitry and VSB synchrodyning circuitry. The QAM synchrodyning circuitry generates real and imaginary sample streams of interleaved QAM symbol code, by synchrodyning the digitized final IF signal to baseband providing it is a QAM signal and otherwise processing the digitized final IF signal as if it were a QAM signal to be synchrodyned to baseband. The VSB synchrodyning circuitry generates a real sample stream of interleaved VSB symbol code, by synchrodyning the digitized final IF signal to baseband providing it is a VSB signal and otherwise processing the digitized final IF signal as if it were a VSB signal to be synchrodyned to baseband. A pilot-carrier-presence detector or an imaginary-sample-presence detector detects whether or not the final IF signal is a VSB signal to generate a control signal, which is in a first condition when the final IF signal apparently is not a VSB signal and is in a second condition when the final IF signal apparently is a VSB signal. Responsive to the control signal being in its first condition, the radio receiver is automatically switched to operate in a QAM signal reception mode; and responsive to the control signal being in its second condition, the radio receiver is automatically switched to operate in a VSB signal reception mode. The satisfactory operation of the imaginary-sample-presence detector of U.S. Pat. No. 5,506,636 depends on achieving synchronized detection of the pilot carrier wave accompanying the VSB DTV signal. Satisfactory operation of the pilot-carrier-presence detector of U.S. Pat. No. 5,715,012 also depends on achieving synchronized detection of the pilot carrier wave accompanying the VSB DTV signal. If there is difficulty with synchronizing with a VSB DTV signal, there is possibility of an undesirable lock-out condition wherein the receiver is placed into a QAM reception mode and control of the frequency and phase of the third local oscillator responsive to baseband VSB demodulation is prevented.

U.S. patent application Ser. No. 08/746,294 entitled "DIGITAL TV RECEIVER WITH MATCH FILTER RESPONSIVE TO FIELD SYNCHRONIZATION CODE IN THE FINAL I-F SIGNAL ENVELOPE", filed Nov. 6, 1996 by J. W. Ko and A. L. R. Limberg, describes a QAM/VSB DTV signal receiver having an envelope detector for detecting the envelope of the final intermediate-frequency signal and having a match filter for detecting the occurrence of PN sequences in the envelope detector response. U.S. patent application Ser. No. 08/746,294 suggests that the suppressed-carrier amplitude modulation conveying PN sequences, which modulation is essentially single-sideband in nature, be considered to be a phase-modulated carrier wave when attempting to understand why the PN sequences in the data field synchronization information give rise to variations in the envelope of the intermediate-frequency signal that reproduce those sequences when a relatively small pilot carrier is present. U.S. patent application Ser. No. 08/746,294 suggests that the relatively small pilot carrier then be viewed as being single-sideband amplitude modulation of that phase-modulated carrier wave. When the relatively small pilot carrier and the relatively large phase-modulated carrier wave are of similar phase, the envelope of the combined signal will exhibit increased amplitude, it is noted in U.S. patent application Ser. No. 08/746,294. When the relatively small pilot carrier and the relatively large phase-modulated carrier wave are of dissimilar phase, the envelope of the combined signal will exhibit decreased amplitude, it is further noted in U.S. patent application Ser. No. 08/746,294. It is pointed out in U. S. patent application serial No. 08/746,294 that, accordingly, the envelope of the intermediate-frequency signal, which is a bandpass transform of the baseband combined signal, will exhibit increased and decreased amplitude in accordance with the positive and negative excursions of the pseudo-random sequences in the data field synchronization information.

In the DTV signal receiver described in U.S. patent application Ser. No. 08/746,294, the presence or absence of VSB pilot carrier in received VSB DTV signal as synchrodyned to baseband is detected by a pilot-carrier-presence detector in order to generate a QAM/VSB control signal for determining whether the receiver is to be conditioned for operation in a QAM signal reception mode or is to be conditioned for operation in a VSB signal reception mode. I. e., QAM/VSB control signal is generated in substantially the same way as in the QAM/VSB DTV signal receiver described in U.S. Pat. No. 5,715,012.

The invention seeks to detect the reception of VSB DTV signal so as to be less susceptible to error caused by rapidly changing multi-path reception, co-channel interference, or failure to completely achieve synchronized detection of the pilot carrier wave. The invention depends on the fact that the data field synchronization segment as symbol coded for VSB transmission comprises pseudo-random noise (PN) sequence information that can be detected using a match filter in a television signal radio receiver capable of receiving VSB DTV signals and at least one other type of television signal. Embodiments of the invention in which the other type of television signal is a QAM DTV signal take advantage of the fact that the data field synchronization segment as symbol coded for QAM transmission does not contain the PN sequence information that can be detected using the same match filter used for detecting the PN sequence information in the VSB transmission. Embodiments of the invention in which the other type of television signal is an NTSC analog television signal take advantage of the fact that the envelope of the final I-F signal when an analog television signal is being received is not apt to resemble a PN sequence.

SUMMARY OF THE INVENTION

The invention is embodied in a television signal radio receiver for selectively receiving vestigial-sideband (VSB) digital television (DTV) signals and television signals of at least one other type, each said VSB DTV signal having pseudo-random noise (PN) sequence information in the initial data segment of each successive one of the data fields thereof. The television signal radio receiver comprises an envelope detector for demodulating intermediate-frequency amplifier response to VSB DTV signals to generate a baseband signal and a PN sequence presence detector responsive to the baseband signal for detecting the occurrence of the PN sequence information therein when a VSB DTV signal is being received. The PN sequence presence detector provides an output signal with an indication of each such occurrence, which indication is sustained for a period of time at least as long as the duration of a data field. The television signal radio receiver further comprises circuitry for operating the receiver in a VSB DTV reception mode responsive to the PN sequence presence detector providing an output signal with an indication of the occurrence of said PN sequence information in said baseband signal, and for operating the television signal radio receiver in a reception mode for another type of television signal responsive to said PN sequence presence detector providing an output signal without indication of the occurrence of said PN sequence information in said baseband signal.

The invention in a more particular aspect thereof is embodied in television signal radio receiver in which the PN sequence presence detector comprises match filter circuitry receptive of the baseband signal for providing match filter response to the PN sequence information in the data field synchronization segment of a received VSB DTV transmission, a threshold detector for determining when the match filter response is of sufficient energy to indicate occurrence in a received DTV signal of the PN sequence information in the data field synchronization segment of a VSB DTV transmission, and timed latch circuitry for latching the indication for a period of time longer than at least one DTV data field, thereby to generate the output signal of the PN sequence presence detector.

DETAILED DESCRIPTION

Figure 1:
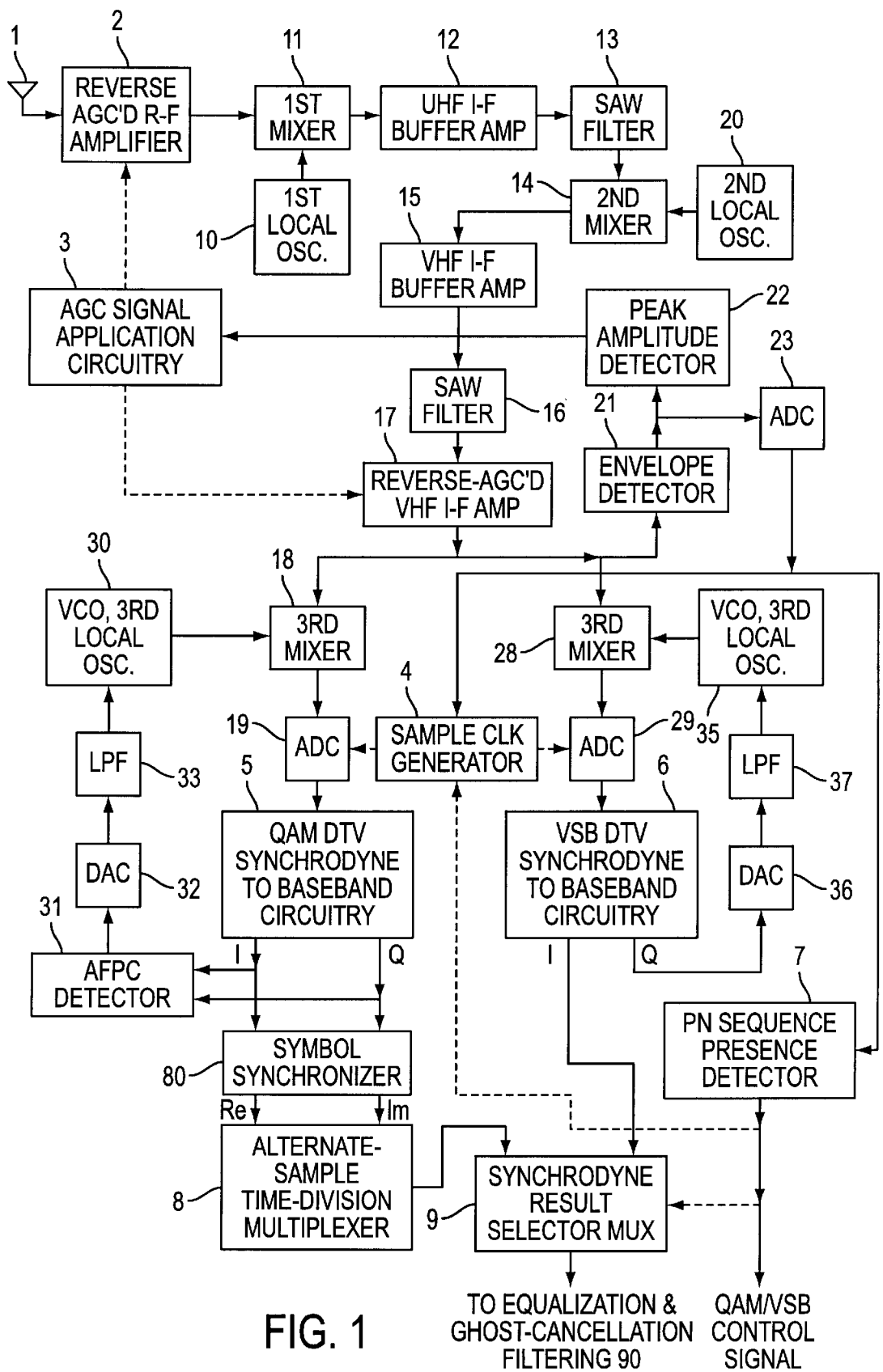
FIG. 1 is a block schematic diagram of the radio receiver portions of one type of QAM/VSB DTV signal receiver embodying the invention, which portions are used to recover baseband symbol coding for QAM DTV signal and for VSB DTV signal.

FIG. 1 shows the radio receiver portions of a DTV receiver capable of receiving either QAM or VSB digital TV signals. An antenna 1 is a representative source of TV signals in ultra high frequency (UHF) band, or possibly in the very high frequency (VHF) band, which TV signals are applied to a radio-frequency (R-F) amplifier 2. The R-F amplifier 2 is provided with a tracking preselection filter for selecting a portion of the one of the television broadcast bands that contains the television signal selected for reception. The R-F amplifier 2 is reversed-AGC'd in response to delayed automatic-gain-control (delayed-AGC) signals supplied to the R-F amplifier 2 from automatic-gain-control signal application circuitry 3. The R-F amplifier 2 supplies amplified response to the television signal selected for reception.

This amplified response is mixed with a super-heterodyning signal from a first local oscillator 10 for upconversion to a high intermediate-frequency band, which is above the highest frequency television channel in the ultra-high frequency (UHF) spectrum. In line with current TV practice, the first local oscillator 10 is usually a frequency synthesizer for generating the super-heterodyning signal of a frequency in selected ratio with the frequency of a component controlled oscillator, with the frequency of the controlled oscillator being controlled by AFT signal. This preferred practice results in the sensitivity of the super-heterodyning signal frequency to AFT signal being substantially the same for all received TV channels. The 6-MHz-wide selected radio-frequency signal supplied by the R-F amplifier 2 is upconverted to an ultra-high-frequency intermediate-frequency signal in a first mixer 11, which preferably is of a doubly-balanced linear-multiplication type. This UHF I-F signal is centered at an ultra-high frequency above that portion of the UHF band containing assigned channels for television broadcasting, placing the image frequencies well above 1 GHz so they are easily rejected by a bandpass coupling network at the output of the first mixer 11. (This coupling network is not explicitly shown in FIG. 1.)

A ultra-high-frequency-band intermediate-frequency buffer amplifier 12 applies the UHF I-F signal to a surface-acoustic-wave (SAW) filter 13. The UHF I-F buffer amplifier 12 provides fixed gain to make up the 10–12 dB insertion loss of the SAW filter 13 and drives the SAW filter 13 from a fixed source impedance chosen to avoid unwanted reflections. The SAW filter 13 has a bandwidth at least 5.38 MHz wide and determines the channel characteristics of the first I-F amplifier chain. By way of example, the UHF I-F signal can be centered at 916 MHz. A gallium arsenide SAW filter 13 can be operated satisfactorily in this frequency range. The response of the SAW filter 13 is supplied to a second mixer 14 for downconversion to a very-high-frequency intermediate-frequency signal centered at a very high frequency below that portion of the VHF band containing assigned channels for television broadcasting. This VHF I-F signal can be centered at about 44 MHz, as common in analog TV practice. A local oscillator 20, which is preferably of a crystal-controlled type, supplies a heterodyning signal of stable fixed frequency to the second mixer 14 for implementing the downconversion therein. The second mixer 14 is preferably of a doubly-balanced linear-multiplication type.

A very-high-frequency-band intermediate-frequency buffer amplifier 15 applies the VHF I-F signal to a surface-acoustic-wave (SAW) filter 16 the bandwidth of which is at least 5.38 MHz wide. The VHF I-F buffer amplifier 15 provides fixed gain to make up the 10–12 dB insertion loss of the SAW filter 16 and drives the SAW filter 16 from a fixed source impedance chosen to avoid unwanted reflections. A lithium niobate SAW filter 16 can be operated satisfactorily in the frequency range centered at about 44 MHz. The SAW filter 13, the SAW filter 16 and any trap filters included in the I-F amplifier chain are arranged to provide insofar as possible an overall linear-phase transmission channel at least 5.38 MHz wide. The introduction of Nyquist-slope and carrier-slope roll-offs are typically done in this filtering. The response of the SAW filter 16 is supplied as input signals to automatic-gain-controlled VHF intermediate-frequency amplifier 17.

The VHF I-F amplifier 17 supplies its response as input signal to a third mixer 18, which supplies a final intermediate-frequency signal for digitization by an analog-to-digital converter 19, and to another third mixer 28, which supplies a final I-F signal for digitization by an analog-todigital converter 29. A voltage-controlled oscillator 30 supplies VHF oscillations to the third mixer 18 for heterodyning with VHF I-F amplifier 17 response to generate a final I-F signal offset from zero frequency with its highest frequency no higher than 10.76 MHz.

The ADC 19 digitizes the final I-F signal from the third mixer 18 for application to digital synchrodyne circuitry 5, which is designed for responding to QAM DTV signal in that final I-F signal to recover respective in-phase (I) and quadrature-phase (Q) baseband signals. These I and Q baseband signals are supplied to symbol synchronizer circuitry 80 to be converted to real and imaginary baseband signals descriptive of QAM symbols. The I and Q baseband signals are supplied to an automatic-frequency-and-phase-control detector 31, which AFPC detector 31 supplies its output signal to a digital-to-analog converter 32 for conversion to an analog signal supplied to an analog lowpass filter 33. The filter 33 response is supplied as an automatic-frequency-and-phase-control (AFPC) signal to the VCO 30 used as third local oscillator in the detection of QAM DTV signals.

A voltage-controlled oscillator 35 supplies VHF oscillations to the third mixer 28 for heterodyning with VHF I-F amplifier 17 response to generate a final intermediate-frequency signal offset from zero frequency with its highest frequency no higher than 10.76 MHz. The ADC 29 digitizes the final I-F signal from the third mixer 28 for application to digital synchrodyne circuitry 6, which is designed for responding to VSB DTV signal in the final intermediate-frequency signal to recover respective in-phase (I) and quadrature-phase (Q) baseband signals, the former of which baseband signals is descriptive of VSB AM symbols. The quadrature-phase baseband signal from the synchrodyne circuitry 6 is converted to analog form by a digital-to-analog converter 36. A lowpass filter 37 extracts a low-frequency beat term from the DAC 36 response for application to the VCO 35 as its AFPC signal, for adjusting the frequency and phase of the VCO 35 to reduce the low-frequency beat term in the lowpass filter 37 response to zero. Digital lowpass filtering is included before the digital-to-analog converter 36 in some designs.

An envelope detector 21 detects the envelope of the VHF I-F amplifier 17 response. The detected envelope has its peak value determined by a peak amplitude detector 22. The peak amplitude detector 22 is preferably of a design that does not respond to impulse noise spikes. The peak amplitude detector 22 supplies its measurements of the amplitude of the VHF I-F amplifier 17 response to automatic-gain-control signal application circuitry 3 as input signal thereto. The AGC signal application circuitry 3 applies an automatic-gain-control (AGC) signal to the VHF I-F amplifier 17. In order better to preserve linearity of digital modulation in the VHF I-F amplifier 17 response, reverse AGC is employed with this amplifier. The AGC signal application circuitry 3 also supplies delayed AGC signal to the R-F amplifier 2 for reducing the gain through the R-F amplifier 2 when very strong signals are received. Gain reduction can be provided in the R-F amplifier 2 by attenuating the input signal received at its input port with an attenuator using PIN diodes in its construction, for example. This avoids strong signals being clipped in the amplifier 2 or the first mixer 11.

The envelope of the VHF I-F amplifier 17 response as detected by the envelope detector 21 is sampled and the samples digitized by an analog-to-digital converter 23. The ADC 23 output signal is utilized by a sample clock generator 4 to synchronize sampling with the received DTV signal symbol code. The sample clock generator 4 and the synchronization thereof with received DTV signal symbol coding will be described in detail further on in this specification with reference to FIG. 7 of the drawing.

The ADC 23 output signal is applied to a PN sequence presence detector 7 as its input signal. In accordance with an important aspect of the invention, the PN 15 sequence presence detector 7 senses the presence of PN sequences included in the data field synchronization (DFS) signals of a VSB DTV to signal the reception of the VSB DTV signals. Detector 7 senses the absence of those PN sequences to signal the reception of TV signals other than VSB DTV signals. More particularly, the PN sequence presence detector 7 can be of a type for sensing the PN63 sequences transmitted during field sync data segments in a received VSB DTV signal. However, the PN sequence presence detector 7 preferably is of a type for sensing the PN511 sequences transmitted during those field sync data segments. The PN sequence presence detector 7 supplies indications of the absence or presence of the PN sequences transmitted during field sync data segments in a received VSB DTV signal, thereby to provide a QAM/VSB reception control signal used as control signal by a synchrodyne result selection multiplexer 9.

The real and imaginary baseband signals from the symbol synchronizer 80 are interleaved on an alternate-sample basis by a time-division-multiplexer 8. Because the I and Q baseband signals from the digital synchrodyne circuitry 5 are over-sampled, and thus the real and imaginary baseband signals from the symbol synchronizer 80 are over-sampled, interleaving is done without loss of information. Responsive to QAM/VSB reception control signal from the VSB DTV reception detector 7 indicating that the received signal is not a VSB DTV signal, the DTV signal receiver is conditioned for operation in a QAM reception mode. In the QAM reception mode, the synchrodyne result selection multiplexer 9 is conditioned to forward the response of the time-division-multiplexer 8 composed of time-interleaved real and imaginary baseband signals to the equalization and ghost-cancellation filtering 90 of FIG. 2. Responsive to the QAM/VSB reception control signal from the VSB DTV reception detector 7 indicating that the received signal is a VSB DTV signal, the DTV signal receiver is conditioned for operation in a VSB reception mode. In the VSB reception mode the synchrodyne result selection multiplexer 9 selects the in-phase baseband signal from the digital synchrodyne circuitry 6 to be forwarded as a real baseband signal to the equalization and ghost-cancellation filtering 90 of FIG. 2.

Figure 2:
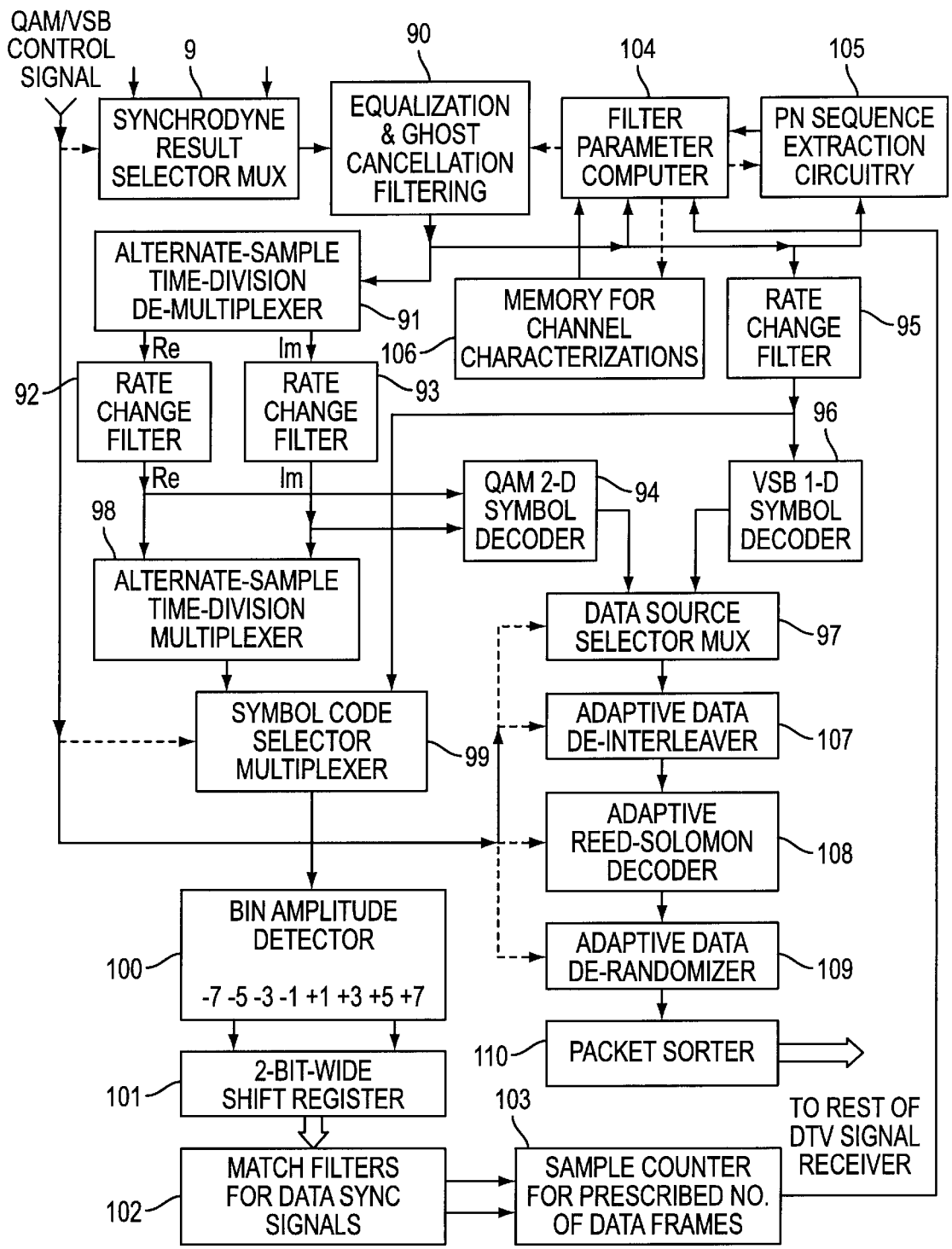
FIG. 2 is a block schematic diagram of further portions of a QAM/VSB DTV signal receiver as shown in FIGS. 1, 17, 18 or 19.

The equalization and ghost-cancellation filtering 90 shown in FIG. 2 converts a baseband response with an amplitude-versus-frequency characteristic that tends to cause inter-symbol error to a more optimum amplitude-versus-frequency characteristic that minimizes the likelihood of inter-symbol error. The equalization and ghost-cancellation. filtering 90 can be realized using a suitable one of the monolithic ICs available off-the-shelf for use in equalizers. Such an IC includes a multiple-tap finite-impulse-response digital filter used for amplitude-and-group-delay equalization, the tap weights of which FIR filter are programmable; circuitry for selectively accumulating training signal and temporarily storing the accumulation results; and a microcomputer for comparing the temporarily stored accumulation results with an ideal training signal as known a priori and for calculating updated tap weights of the multiple-tap digital filter used for amplitude-and-group-delay equalization. Other configurations for the equalization and ghost-cancellation filtering 90 separate the functions of ghost-cancellation and equalization to reduce the number of taps in the kernel of the filter used for final amplitude-and-group-delay equalization after ghost-cancellation is carried out by cascaded sparse-kernel filters of finite- and infinite-impulse response types. The equalization and ghost-cancellation filtering 90 can be designed such that after initial determination of filter parameters is done using a training signal to speed up convergence, the filter parameters are adjusted by data directed methods to improve dynamic operation under changing multipath conditions. The response of the equalization and ghost-cancellation filtering 90 is supplied to circuitry in FIG. 7 that carries out symbol synchronization, as will be explained further on in this specification.

Referring back to FIG. 2, the alternate-sample time-division multiplexing of the real and imaginary samples of the baseband QAM symbol code in the response of the equalization and ghost-cancellation filtering 90 is de-multiplexed by a de-multiplexer 91. During reception of a QAM DTV transmission the de-multiplexer 91 recovers a stream of real baseband QAM symbol code samples and a stream of imaginary baseband QAM symbol code samples. These parallel streams are separate from each other and have been subjected to the same equalization and ghost-cancellation filtering in the filter circuitry 90. The stream of real baseband QAM symbol code samples is supplied from the de-multiplexer 91 to a rate-change filter 92, and the stream of real baseband QAM symbol code samples is supplied from the de-multiplexer 91 to a rate-change filter 93. The rate-change filters 92 and 93 decimate the real and imaginary streams of samples to generate respective $5.38*10^6$ samples per second response at the symbol rate for QAM. These streams of samples are applied as input signal to a two-dimensional symbol decoder 94, which performs the symbol decoding that recovers a symbol-decoded digital data stream from a QAM DTV signal and that customarily includes trellis decoding performed according to the Viterbi algorithm.

During reception of a VSB DTV transmission the response of the equalization and ghost-cancellation filtering 90 is supplied to a rate-change filter 95 that decimates the stream of real samples to $10.76*10^6$ samples per second rate, which is the symbol rate for VSB. The decimated stream of real samples is applied as input signal to a one-dimensional symbol decoder 96, which performs the symbol decoding that recovers a symbol-decoded digital data stream from a VSB DTV signal and that customarily includes trellis decoding performed according to the Viterbi algorithm. The symbol decoding results from the symbol decoders 94 and 96 are respectively supplied to a first input port and a second input port of a multiplexer 97 functioning as a data-source selector. Responsive to the QAM/VSB control signal being in the state to condition the DTV signal receiver to be in its QAM DTV signal reception mode, the multiplexer 97 reproduces at is output port the data supplied to its first input port from the symbol decoder 94. Responsive to the QAM/VSB control signal being in the state to condition the DTV signal receiver to be in its VSB DTV signal reception mode, the multiplexer 97 reproduces at is output port the data supplied to its second input port from the symbol decoder 96.

The responses of the rate-change filters 92 and 93 are time-division multiplexed on an alternate sample basis by a time-division multiplexer 98. This generates a stream of samples supplied to the first input port of a symbol code multiplexer 99 that receives at its second input port the real samples of baseband VSB symbol code in the rate-change filter 95 response. Responsive to the QAM/VSB control signal being in the state to condition the DTV signal receiver to be in its QAM DTV signal reception mode, the multiplexer 99 reproduces at its output port the alternated real and imaginary components of baseband QAM symbol code supplied to its first input port. Responsive to the QAM/VSB control signal being in the state to condition the DTV signal receiver to be in its VSB DTV signal reception mode, the multiplexer 99 reproduces at its output port the baseband VSB symbol code supplied to its second input port. The time-division multiplexer 98 alternately selects the real and imaginary components of baseband QAM symbol code supplied to the first input port of the multiplexer 99 so that the same data synchronization codes that accompany VSB DTV signal transmissions are recovered from the QAM DTV signal transmissions.

The symbol coding supplied from the output port of the symbol code multiplexer 99 is match filtered to detect the occurrence of data synchronization codes. As a step in this match filtering, bin amplitude comparator 100 decodes the symbol coding supplied from the output port of the symbol code multiplexer 99. A common form of data slicer comprises a bin amplitude comparator and read-only memory (ROM). The amplitude bins of the comparator conform to data slices of the digitized baseband symbol code signals, with the occupancy indication for the amplitude bin into which the amplitude of the current digital sample of baseband symbol code falls being a logic ONE and the occupancy indications for the other amplitude bins all being logic ZEROs. The ROM is addressed by the concurrent occupancy indications, which form a unary code, and converts that unary code to a binary code to supply parallel-bit-groups of successive symbol decoding results. This type of data slicer is termed a "hard" data slicer because of the invariance in the boundaries of the data slices, which data slices correspond to the amplitude ranges of the bins in the bin amplitude comparator. In the data slicer used for over-the-air ATSC DTV signals the bins in the bin amplitude comparator are centered on the eight levels of 3-bit symbol coding having normalized values of −7, −5, −3, −1, +1, +3, +5 and +7. The bin amplitude comparator 100 essentially corresponds to the bin amplitude comparator for such a data slicer; the ROM used in such a data slicer is here omitted as not being vital to the match filtering used for detecting the occurrence of data synchronization codes. Presuming the equalization and ghost-cancellation filtering 90 has a zero in its spectral response at zero-frequency, the bin amplitude comparator 100 essentially corresponds to the bin amplitude comparator used in a data slicer for the real or imaginary component of a QAM signal with 64-point constellation. The symbol code values associated with the +S and −S amplitude excursions of the data synchronization signals fall in the +5 and −5 bins, respectively of the bin amplitude comparator 100. These are the only symbol code values that need be detected when match filtering to detect data synchronization signals. Accordingly, if one desires, the construction of the bin amplitude comparator 100 can be simplified by consolidating the −3, −1, +1 and +3 amplitude bins.

The bin amplitude comparator 100 supplies the occupancy results from its +5 and −5 bins as 2-parallel-bit serial input to a plural-stage shift register 101 used as a serial-in/parallel-out register to supply input signals to match filters 102 for the data synchronization signals. One bit from each of the 2-parallel-bit output signals of four consecutive stages of the shift register 101, selected in accordance with the ONEs in those signals when a data segment synchronization code segment is being detected, are ANDed in a four-input AND gate (not specifically shown in FIG. 2) to detect the data segment synchronization code segment and generate a DATA SEGMENT START (or DSS) signal. An ODD DATA FIELD START (or ODFS) signal and an EVEN DATA FIELD START (or EDFS) signal can be generated by match filtering the data field synchronization codes in their entirety using a 699- or 700-stage shift register 101. However, the ODFS and EDFS signals can be generated satisfactorily using only a 188- or 189-stage shift register 101. Presuming ay 189-stage shift register 101 to be used, one bit from each of the 2-parallel-bit output signals of each of those 189 stages, selected in accordance with the ONEs in those signals when the triple PN sequence in an odd data field synchronization code segment is being detected, is supplied to a first 189-input digital adder network and the resulting sum supplied to a first threshold detector that generates the ODD DATA FIELD START signal only if the sum from the first adder network exceeds a prescribed value greater in substantial measure than one-hundred twenty-six and somewhat less than one-hundred eighty-nine. And one bit from each of the 2-parallel-bit output signals of each of the 189 stages in shift register 101, selected in accordance with the ONEs in those signals when the triple PN sequence in an even data field synchronization code segment is being detected, is supplied to a second 189-input digital adder network and the resulting sum supplied to a second threshold detector that generates the EVEN DATA FIELD START signal only if the sum from the second adder network exceeds a prescribed value. The first and second adder networks can share certain adders in common.

A sample counter 103 counts the samples in the baseband symbol codes for a number at least one of data frames. The sample count comprises a least significant portion in which counting is done modulo-832, 832 being the number of samples in a data segment; a more significant segment-count portion in which counting is done modulo-313, 313 being the number of data segments in a data field; and a most significant field-count portion in which counting of data fields is done modulo-$2^N$, N being an integer at least one. The least significant portion of the sample count at the time one of the matched filters 102 generates a DATA SEGMENT START (or DSS) signal is checked within the sample counter 103 to determine whether it is four. The least significant portion of the sample count is corrected if it is not four.

At the time one of the matched filters 102 generates an ODD DATA FIELD START signal, the segment-count portion of the sample count is checked within the sample counter 103 to determine whether it is one. The segment-count portion of the sample count is corrected to one if it is not one. The field-count portion of the sample count is checked within the sample counter 103 to determine whether it is odd, and the field-count portion of the sample count is corrected to be odd if it is not odd.

At the time one of the matched filters 102 generates an EVEN DATA FIELD START signal, the segment-count portion of the sample count is checked within the sample counter 103 to determine whether it is one. The segment-count portion of the sample count is corrected to one if it is not one. The field-count portion of the sample count is checked within the sample counter 103 to determine whether it is even, and the field-count portion of the sample count is corrected to be even if it is not even.

The sample count from the sample counter 103 is used by a microcomputer 104 to control certain of its operations and to control certain operations of the PN sequence extraction circuitry 105. The microcomputer 104 calculates the filtering parameters for the adaptive filters of the equalization and ghost-cancellation filtering 90. PN sequence extraction circuitry 105 selectively responds to the filtering 90 response to separate the PN sequences that occur during data field synchronization segments of baseband symbol coding and also to separate the ghosts of those PN sequences. The microcomputer 104 responds to the sample count from the sample counter 102 indicating the initial data segment of a data frame appears in the filtering 90 response to condition the PN sequence extraction circuitry 105 to gate the initial data segment of each data field to line storage memory (not explicitly shown in FIG. 2) within the PN sequence extraction circuitry 105.

The microcomputer 104 has a non-volatile memory 106 associated therewith for storing channel characterization information between times a channel is tuned, including times the DTV receiver is not in use and power is shut off from the receiver at least in principal part. The memory 106 is preferably a part of larger non-volatile channel memory (not shown in the drawing) which stores for each programmed channel:

(a.) information concerning source of signal, such as cable or satellite narrowcast or terrestrial broadcast;

(b.) whether the channel is locked-out for viewing unless keying code is submitted (to prevent children viewing certain channels, etc.);

(c.) preferred antenna orientation for satellite narrowcast or terrestrial broadcast;

(d.) tuning information for the first local oscillator 10, which is presumed to be a frequency synthesizer; and (e.) channel characterization information in regard to principal fixed ghosts stored in the memory 106.

Addresses for most of this larger non-volatile channel memory can be supplied from a programmable read-only memory (PROM) addressable by channel number and a code indicating the source of signal to be accessed or alternatively by an up/down counter controlled by a human programmer.

When a channel is re-tuned, the channel characterization information in regard to principal, higher-energy fixed ghosts stored in the non-volatile memory 106 is used by the microcomputer 104 to compute of an initial set of filtering parameters for the adaptive filters of the equalization and ghost-cancellation filtering 90. This computation takes considerably less time than required if, before the computation of the initial set of filtering parameters could proceed, training signal had to be acquired from the newly tuned DTV channel and the channel had to be then characterized from the training signal. Accordingly, rapid tuning between channels is facilitated.

After the initial set of filtering parameters for the adaptive filters of the equalization and ghost-cancellation filtering 90 is computed, the initial data segments of data fields stored in line storage memory within the PN sequence extraction circuitry 105 under control of the microcomputer 104 are utilized as training signal for adjusting the initial set of filtering parameters for the adaptive filters of the equalization and ghost-cancellation filtering 90. The transmission channel is characterized anew preparatory to adjusting the initial set of filtering parameters, to correct for changes in static ghosting conditions arising if the DTV signal receiver has been moved since the channel was last tuned, and to suppress static ghosts of lesser energy than those described stored in the non-volatile memory 106. Differentially combining corresponding samples in initial data segments of the odd and even data fields of the ATSC DTV signal facilitates the separation of a PN63 sequence and its ghosts from other components of those initial data segments, for use in channel characterization per methods known in the art, for example.

After the adjustment of the filtering parameters for the adaptive filters of the equalization and ghost-cancellation filtering 90 is computed from the training signal, there can be continuing adjustment of the filtering parameters carried out by the microcomputer 104 using data directed methods. This permits suppression of dynamic ghosts during changing fade conditions.

The data selected by the data source selection multiplexer 97 are applied to a data de-interleaver 107 as its input signal, and the de-interleaved data supplied from the data de-interleaver 107 are applied to a Reed-Solomon decoder 108. The data de-interleaver 107 is often constructed within its own monolithic IC and is made so as to respond to the output indications from the VSB DTV reception detector 7 to select the de-interleaving algorithm suitable to the DTV signal currently being received, whether it be of QAM or VSB type. The Reed-Solomon decoder 108 is often constructed within its own monolithic IC and is made so as to respond to the output indications from the VSB DTV reception detector 7 to select the appropriate Reed-Solomon decoding algorithm for the DTV signal currently being received, whether it be of QAM or VSB type. Error-corrected data are supplied from the Reed-Solomon decoder 108 to a data de-randomizer 109, which responds to these data for regenerating a signal randomized prior to transmission to the DTV receiver, which regenerated signal comprises packets of data for a packet sorter 110. The data de-randomizer 109 is made so as to respond to the output indications from the VSB DTV reception detector 7 to select the appropriate data de-randomizing algorithm for the DTV signal currently being received, whether it be of QAM or VSB type. The packet sorter 110 sorts packets of data for different applications, responsive to header codes in the successive packets of data. The use of such sorted packets in a DTV signal receiver using stereophonic loudspeakers and a kinescope display device is described in U.S. Pat. No. 5,715,012 entitled "RADIO RECEIVERS FOR RECEIVING BOTH VSB AND QAM DIGITAL HDTV SIGNALS" that issued Feb. 5, 1998 to C. B. Patel and A. L. R. Limberg.

Figure 3:
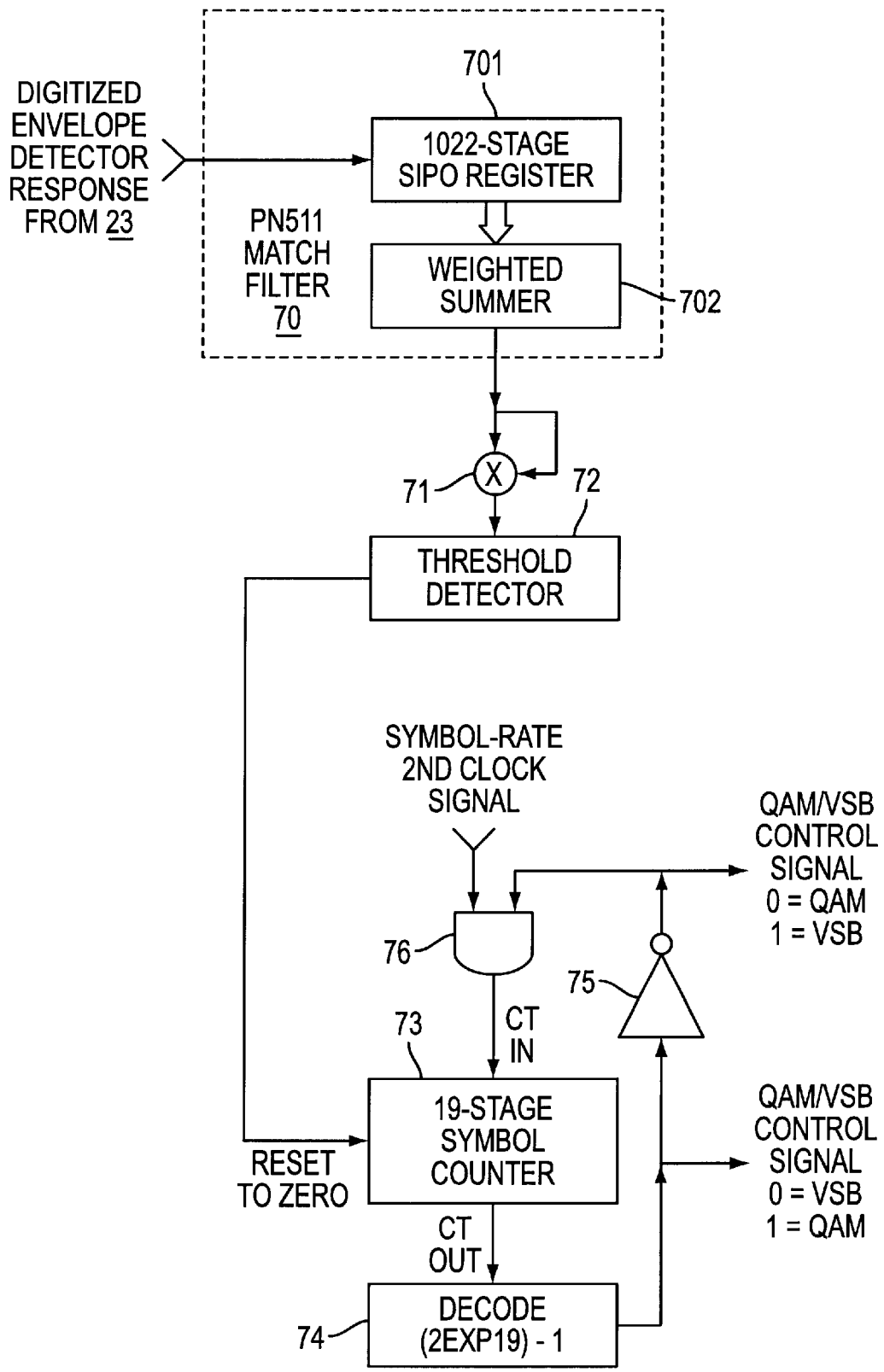
FIG. 3 is a detailed block schematic diagram of a PN511 sequence presence detector constructed in accordance with an aspect of the invention.

FIG. 3 shows in more detail a preferred construction of the PN sequence presence detector 7, which determines whether or not VSB DTV transmissions are being received. The PN sequence presence detector 7 includes a match filter 70 for responding to PN511 sequences in the envelope detector 21 response as digitized by the ADC 23. A representative construction for the match filter 70 includes a serial-in/parallel-out register 701 for receiving the digital samples of ADC 23 response, and a weighted summation network 701 for combining the differentially delayed digital samples temporarily stored in the SIPO register 702. The ADC 23 digitizes the envelope detector 21 response at a multiple M of symbol rate and the SIPO register 701 has 511M stages. The SIPO register 701 has 1022 stages presuming that ADC 23 digitizes the envelope detector 21 response at twice symbol rate. Digitizing the envelope detector 21 response at a multiple of symbol rate allows the match filter 70 to be designed to respond to PN511 sequences irrespective of whether there is precise symbol synchronization with the kernel of the match filter. The kernel of the match filter 70 has M taps for each symbol epoch. These taps are assigned +1 and −1 weights in a weighted summer, the weighting pattern being such as to provide match filtering for a PN511 sequence. The weighted summation network 702 is a tree of signed digital adders, with the M taps corresponding to each relatively positive value in the PN511 sequence contributing additively to the weighted sum from the network 702, and with the M taps corresponding to each relatively negative value in the PN511 sequence contributing subtractively to that weighted sum. The weighted sum supplied by the weighted summation network 702 is the match filter 70 response.

The match filter 70 response is supplied to a squaring circuit 71 to obtain a measure of the energy of each PN511 sequence component. The squaring circuit 71 can realized in logic circuitry or in read-only memory (ROM). A threshold detector 72 responds to the energy of PN511 sequence component exceeding a threshold value to generate a pulse indicative of the occurrence of the PN511 sequence in the envelope detector 21 response. This indication must be latched for at least one data field so the DTV signal receiver will be kept in the VSB reception mode until such time as PN511 sequences are no longer detected each data field or so. The timed latch for performing this latching function can be constructed around a monostable, for example, or alternatively around a symbol counter as shown in FIG. 3.

In FIG. 3 each pulse the threshold detector 72 generates indicative of the occurrence of a PN511 sequence is used to reset a symbol counter 73 to an initial count value (zero). The symbol counter 73 counts occurrences of the second clock signal at symbol rate, as selectively applied to its count input, the counting being done for determining how long it has been since a PN511 sequence with appreciable energy was last detected. By way of example, the symbol counter 73 contains 19 binary stages to permit counting somewhat more than a data frame of symbols. The count output from the symbol counter 73 is supplied to a decoder 74 which decodes a count somewhat short of full count and somewhat more than the number of symbols per data frame, thereby to supply a ONE output rather than the ZERO output otherwise supplied. This decoded count should never be reached if a PN511 sequence is detected at least once per data frame to re-initialize the count output. The decoder 74 output signal provides a QAM/VSB control signal that is ONE when the DTV receiver is to be operated in the QAM reception mode and that is ZERO when the DTV receiver is to be operated in the VSB reception mode. The decoder 74 output signal is inverted by a logic inverter 75 to generate a complementary QAM/VSB control signal that is ZERO when the DTV receiver is to be operated in the QAM reception mode and that is ONE when the DTV receiver is to be operated in the VSB reception mode. One or both of these QAM/VSB control signals is supplied as output signal from the PN sequence presence detector 7.

The logic inverter 75 output signal and the second clock signal supplied at symbol rate are applied as first and second input signals to a two-input AND gate 76. If no PN511 sequence is detected for more than a data frame, so the decoder 74 output signal becomes a ONE, the logic inverter 75 generates an output signal that is ZERO. This conditions the AND gate 76 no longer to supply second clock signal to the symbol counter 73 for counting. The counter 73 output count remains at that value the decoder 74 output signal is a ONE, latching the logic inverter 75 output signal to be ZERO. The DTV signal receiver is conditioned to operate in the QAM reception mode responsive either to the decoder 74 output signal and logic inverter 75 input signal being a ONE, or to the logic inverter 75 output signal being ZERO.

The DTV signal receiver will continue to operate in the QAM reception mode until a PN511 sequence is again detected in the envelope detector 22 response, which re-initializes the counter 73. The decoder 74 output signal then becomes a ZERO, and the logic inverter 75 generates an output signal that is ONE. The DTV signal receiver is conditioned to operate in the VSB reception mode responsive either to the decoder 74 output signal and logic inverter 75 input signal being a ZERO, or to the logic inverter 75 output signal being ONE.

The skilled digital designer will by acquaintance with the foregoing specification be enabled readily to design variants of the FIG. 3 PN sequence presence detector 7 embodying the invention. For example, the squaring circuit 71 can be replaced by an absolute-value circuit. By way of further example, the squaring circuit 71 and threshold detector 72 with positive threshold can be replaced by two threshold detectors, one with a positive threshold and the other with a negative threshold, which threshold detectors have their output responses logically ORed to generate the reset signal of the counter 73.

Figure 4:
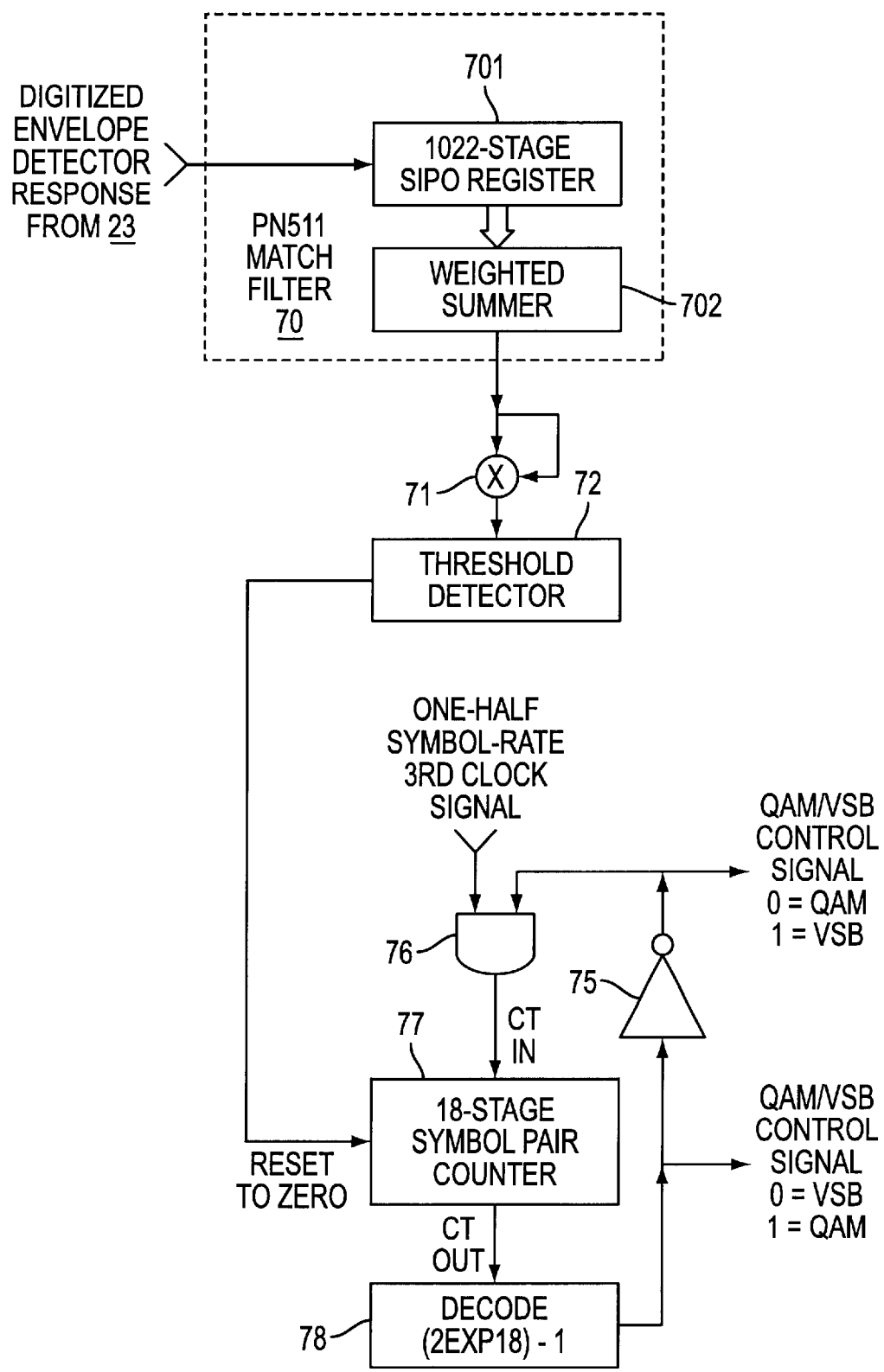
FIG. 4 is a detailed block schematic diagram of another PN511 sequence presence detector constructed in accordance with an aspect of the invention.

FIG. 4 shows a variant of the FIG. 3 PN sequence presence detector 7 in which the 19-stage symbol counter 73 is replaced by an 18-stage symbol-pair counter 77, the decoder 74 is replaced by a decoder 78 for decoding a count somewhat more than the number of symbol pairs in a data frame, and the connections to the AND circuit 76 are modified for selectively supplying half-symbol-rate third clock pulses to be counted.

Figure 5:
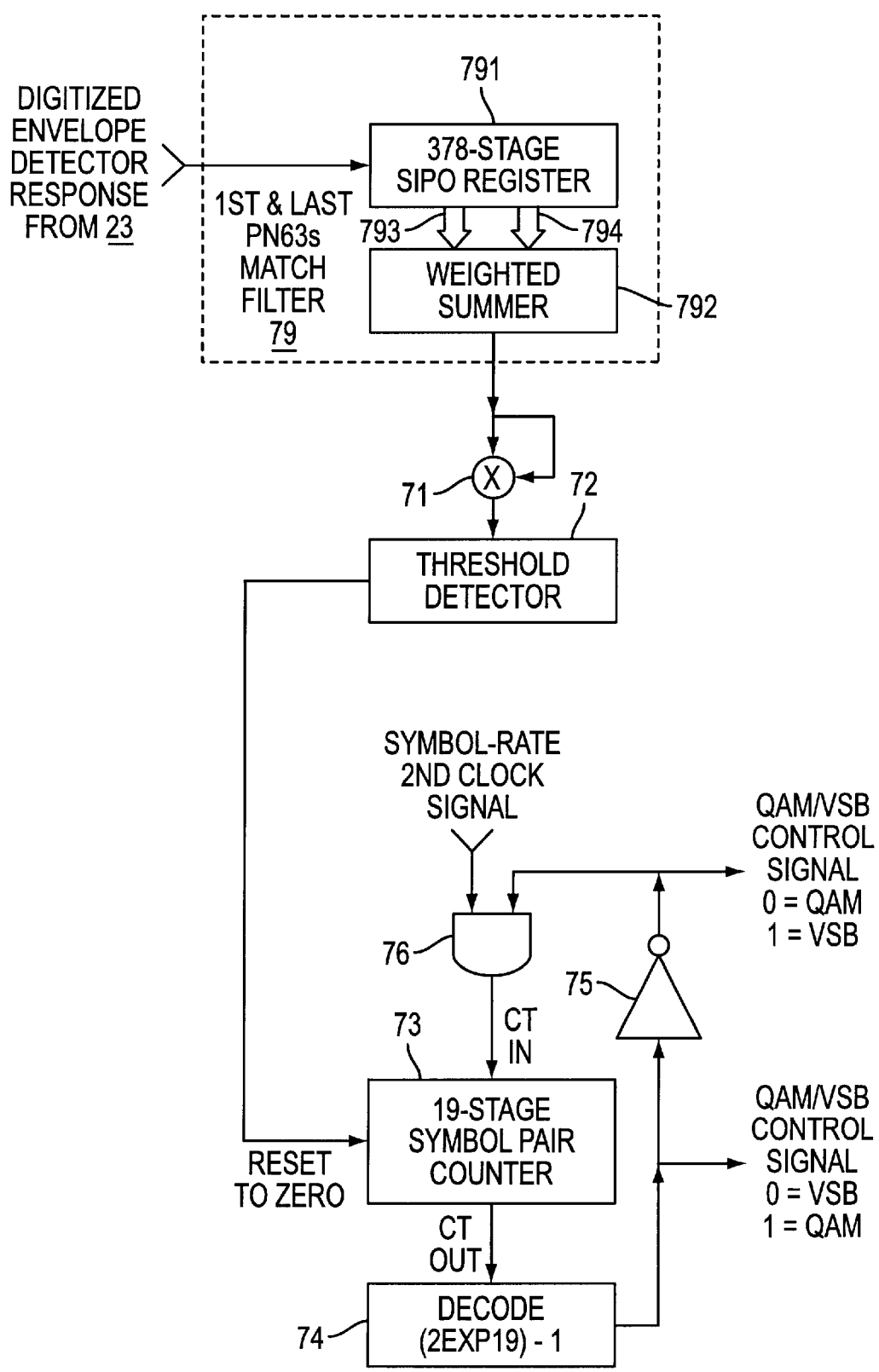
FIG. 5 is a detailed block schematic diagram of a PN63 sequence presence detector constructed in accordance with an aspect of the invention.

FIG. 5 shows a variant of the FIG. 3 PN sequence presence detector 7 in which the PN511 match filter 70 is replaced by a match filter 79 providing match response to the initial and final PN63 sequences in the initial data segment of each data field in a VSB DTV baseband signal. A representative construction for the match filter 79 includes a serial-in/parallel-out register 791 for receiving the digital samples of envelope detector 21 response from the ADC 23, and a weighted summation network 792 for combining the differentially delayed digital samples temporarily stored in the SIPO register 791. The ADC 23 digitizes the envelope detector 21 response at a multiple M of symbol rate and the SIPO register 791 has 189M stages. The SIPO register 791 has 378 stages presuming that ADC 23 digitizes the envelope detector 21 response at twice symbol rate. Digitizing the envelope detector 21 response at a multiple of symbol rate allows the match filter 79 to be designed to respond to initial and final PN63 sequences irrespective of whether there is precise symbol synchronization with the kernel of the match filter. The kernel of the match filter 79 has M taps for each symbol epoch. These taps are assigned +1 and −1 weights in a weighted summer, the weighting pattern being such as to provide match filtering for the initial and final PN63 sequence. The weighted summation network 792 has a plurality 793 of input connections from the initial 63M stages of the SIPO register 791 and has a plurality 794 of input connections from the final 63M stages of the SIPO register 791. The weighted summation network 792 is a tree of signed digital adders. The M taps corresponding to each relatively positive value in the initial and final PN63 sequences contribute additively to the weighted sum from the network 792, and the M taps corresponding to each relatively negative value in the initial and final PN63 sequences contribute subtractively to that weighted sum. The weighted sum supplied by the weighted summation network 792 is the match filter 70 response.

Figure 6:
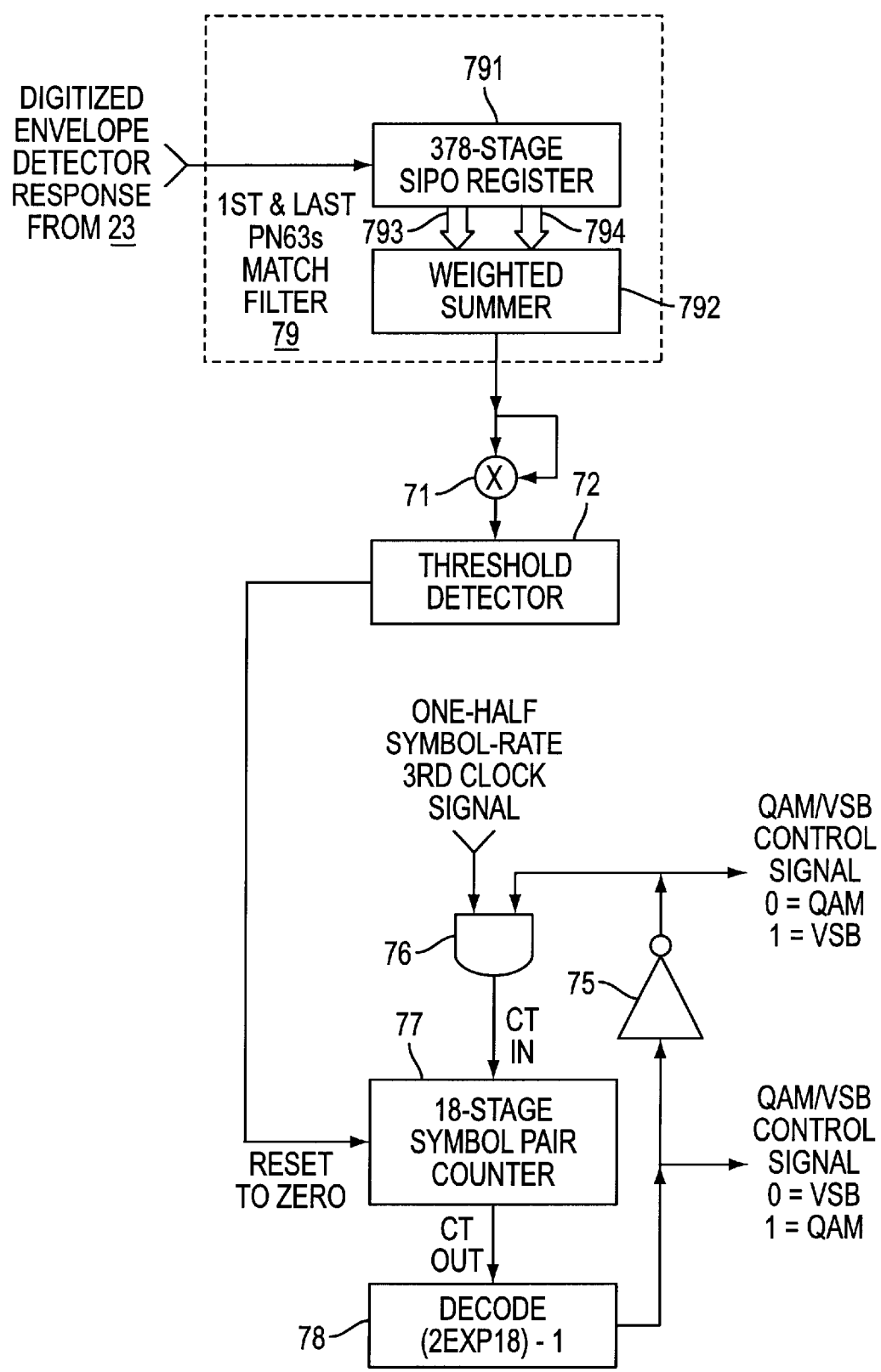
FIG. 6 is a detailed block schematic diagram of another PN63 sequence presence detector constructed in accordance with an aspect of the invention.

FIG. 6 shows a variant of the FIG. 5 PN sequence presence detector 7. In this variant the 19-stage symbol counter 73 is replaced by an 18-stage symbol-pair counter 77, the decoder 74 is replaced by a decoder 78 for decoding a count somewhat more than the number of symbol pairs in a data frame, and the connections to the AND circuit 76 are modified for selectively supplying half-symbol-rate third clock pulses to be counted.

The FIG. 5 or FIG. 6 configuration can be modified for detecting the energy in the middle PN63 sequence in each field synchronization data segment, in addition to detecting the combined energies of the initial and final PN63 sequences in each field synchronization data segment. The combined energies of all three PN63 sequences in each field synchronization data segment can then be threshold detected for resetting the counter 73 or 77. Arrangements where the combined energies of the PN511 sequence and all three PN63 sequences in each field synchronization data segment are threshold detected for resetting the counter 73 or 77 are also possible.

In still other embodiments of the invention a PN sequence presence detector as described above can be used in a television signal radio receiver for receiving both NTSC analog TV signals and VSB DTV signals for controlling the mode of reception.

In still further embodiments of the invention a PN sequence presence detector as described above can be used in a television signal radio receiver for receiving NTSC analog TV signals, VSB DTV signals and QAM DTV signals. The PN sequence presence detector is used to condition the television signal radio receiver for operating in the VSB DTV signal reception mode. The television signal radio receiver is conditioned for operating in the NTSC analog TV signal reception mode by detecting the presence of 4.5 MHz intercarrier signal in the sound circuitry of the NTSC portion of the television signal radio receiver, for example. If the television signal radio receiver is not conditioned for operating in the NTSC analog TV signal reception mode or for operating in the VSB DTV signal reception mode, then the television signal radio receiver is conditioned for operating in the QAM DTV signal reception mode as a default reception condition.

Figure 7:
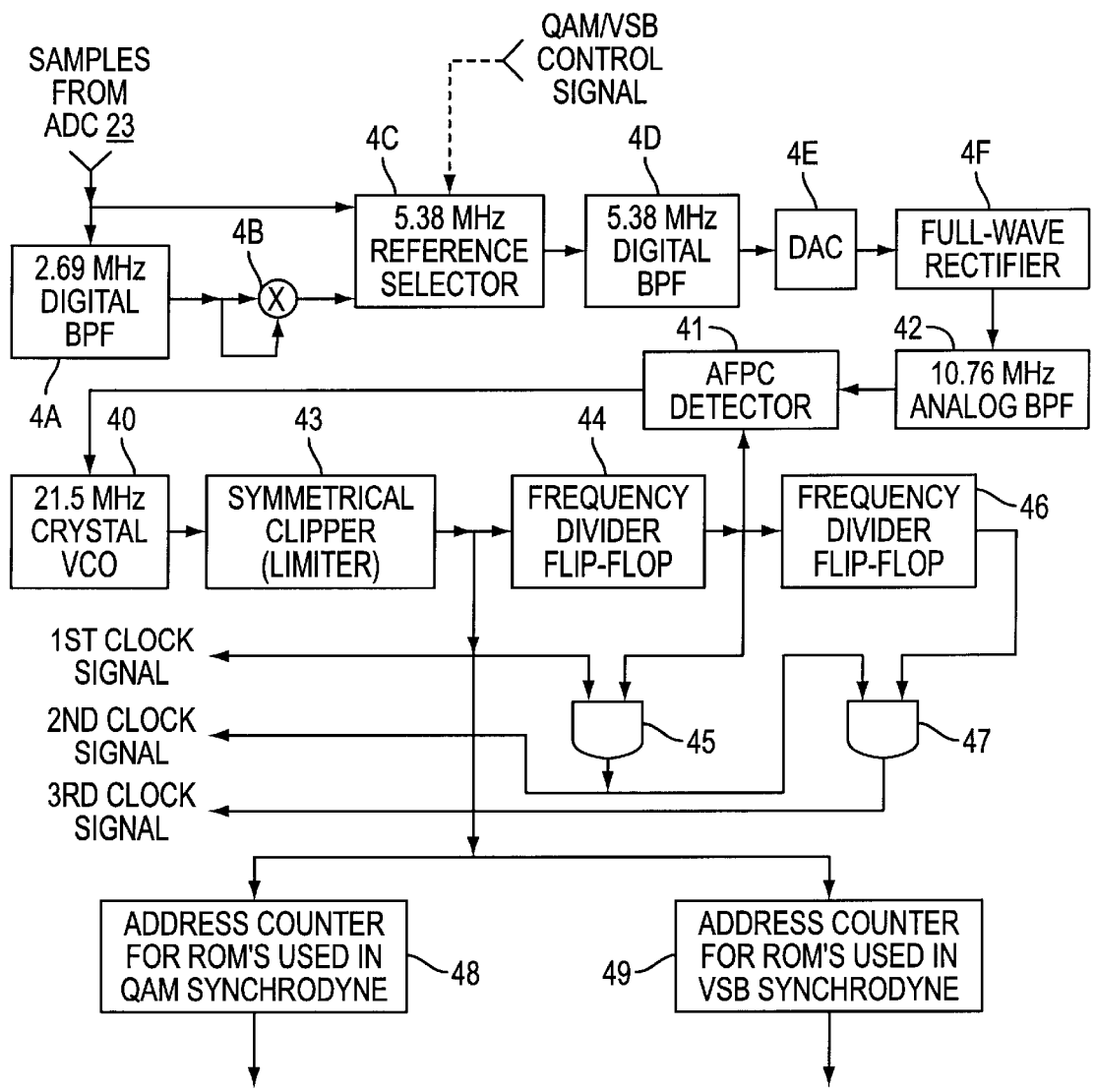
FIG. 7 is a detailed block schematic diagram of circuitry for providing the sample clock generator and the address generators for look-up table read-only memories (ROMs) for supplying digital descriptions of the complex carriers used for synchrodyning digital QAM signals and digital VSB signals at final I-F signal frequencies each to baseband.

FIG. 7 shows in detail a representative construction of the sample clock generator 4 shown in FIG. 1. This construction includes a voltage-controlled oscillator 40 that generates sinusoidal oscillations nominally of 21.52 MHz frequency. The oscillator 40 is a controlled oscillator, the frequency and phase of its oscillations being controlled by an automatic frequency and phase control (AFPC) signal voltage. This AFPC signal voltage is generated by an automatic frequency and phase control (AFPC) detector 41, which compares frequency-divided response to the oscillations of the oscillator 40 with a 10.76 MHz reference carrier supplied from an analog bandpass filter 42. Preferably, oscillator 40 is of a type using a crystal for stabilizing the natural frequency and phase of its oscillations. A symmetrical clipper or limiter 43 generates an essentially square-wave response to these sinusoidal oscillations, which is used as the first clock signal for timing the sampling of final I-F signals by the ADC 19 and the ADC 29. A first frequency-divider flip-flop 44 responds to transitions of the first clock signal in a prescribed sense for generating another square wave with a fundamental frequency of 10.76 MHz, half the frequency of the oscillations of the oscillator 40. The frequency-divider flip-flop 44 supplies square-wave output signal with a fundamental frequency of 10.76 MHz to an AND circuit 45 to be ANDed with the first clock signal for generating a second clock signal used by the rate-change filter 93 (shown in FIG. 2) for implementing 2:1 decimation.

A second frequency-divider flip-flop 46 responds to transitions of the second clock signal in a prescribed sense for generating another square wave with a fundamental frequency of 5.38 MHz, which is applied to an AND circuit 47 to be ANDed with the AND circuit 45 response for generating a third clock signal used by the rate-change filter 91

(shown in FIG. 2) for implementing 4:1 decimation. The square wave with a fundamental frequency of 10.76 MHz provided from the flip-flop 44 is the frequency-divided response to the oscillations of the oscillator 40 supplied to the AFPC detector 41 for comparison with the 10.76 MHz reference carrier supplied from the bandpass filter 42.

The frequency-divider flip-flop 44 supplies the count input to a sample counter 48, which generates addresses for the read-only memories used in the digital synchrodyne circuitry 5 for QAM DTV signal. The counter 48 counts to the value required to read a complete cycle of sine values and cosine values of the QAM complex carrier and then rolls over to its initial count value to continue counting samples.

The frequency-divider flip-flop 44 also supplies the count input to a sample counter 49, which generates addresses for the read-only memories used in the digital synchrodyne circuitry 6 for VSB DTV signal. The counter 49 counts to the value required to read a complete cycle of sine values and cosine values of the VSB complex carrier and then rolls over to its initial count value to continue counting samples. In certain circumstances the counters 48 and 49 can share components or can even be the same counter.

The 10.76 MHz reference carrier selected by the bandpass filter 42 is generated by extracting a component of the received DTV signal as detected by the envelope detector 21, which component is of a frequency that is a subharmonic of the symbol frequency (or baud frequency), and multiplying that subharmonic by an appropriate factor in frequency multiplier circuitry. An analog-to-digital converter (ADC) 23 digitizes the response of the envelope detector 21, so the subharmonic of the symbol frequency can be extracted by digital filtering in a tracking filter operation. When the received DTV signal is a VSB signal having a $10.76*10^6$ symbol per second symbol code rate, the digitized envelope detector response will have a strong component at 5.38 MHz, the first harmonic of that code rate.

When the received DTV signal is a QAM signal having a $5.38*10^6$ symbol per second symbol code rate, the digitized envelope detector response will have a strong component at 2.69 MHz, the first harmonic of that code rate. A bandpass FIR digital filter 4A provides a selective response centered at 2.69 MHz to the ADC 23 output signal, which selective response is supplied to a squaring circuit 4B. The bandpass FIR digital filter 4A will selectively respond to the first subharmonic of the QAM symbol rate from the digitized envelope detector response to QAM DTV signal. The squaring circuit 4B will respond with an output signal having a strong 5.38 MHz component.

A digital multiplexer 4C responds to the VSB DTV reception detector 7 (shown in FIG. 1) indicating that the received DTV signal is not a VSB signal, to select the output signal of the squaring circuit 4B for application to a bandpass filter 4D that provides a selective response centered at 5.38 MHz. The squaring circuit 4B is shown in FIG. 7 as a digital multiplier receiving the filter 4A response both as multiplier and multiplicand. The squaring circuit 4A can be constructed from logic gates as a digital multiplier, but for the sake of speedier operation is better provided by a ROM storing a look-up table of squares. An absolute-value circuit can be used as a substitute for the squaring circuit in generating harmonics of the response of a preceding filter, but produces weaker second harmonics and so is not preferred. The digital multiplexer 4C responds to the VSB DTV reception detector 7 indicating that the received DTV signal is a VSB signal, to select the ADC 23 output signal having a strong 5.38 MHz component for direct application to the bandpass FIR digital filter 4D. The digital bandpass filter 4D selectively responds to the strong 5.38 MHz component appearing in the digital multiplexer 4C output signal when QAM or VSB DTV signal is received. This selective response is applied to a digital-to-analog converter 4E, which responds with an analog 5.38 MHz signal that is rectified by a full-wave rectifier 4F. The analog bandpass filter 42 selects from the full-wave rectifier 4F output signal the 10.76 MHz reference carrier supplied from bandpass filter 42 to the AFPC detector 41. The fill-wave rectifier 4F can be replaced by a squaring device, but the rectifier 4F is preferred for generating the 10.76 MHz reference carrier because the phase relationship between its 10.76 MHz output signal and its 5.38 MHz input signal is well-defined.

Figure 8:
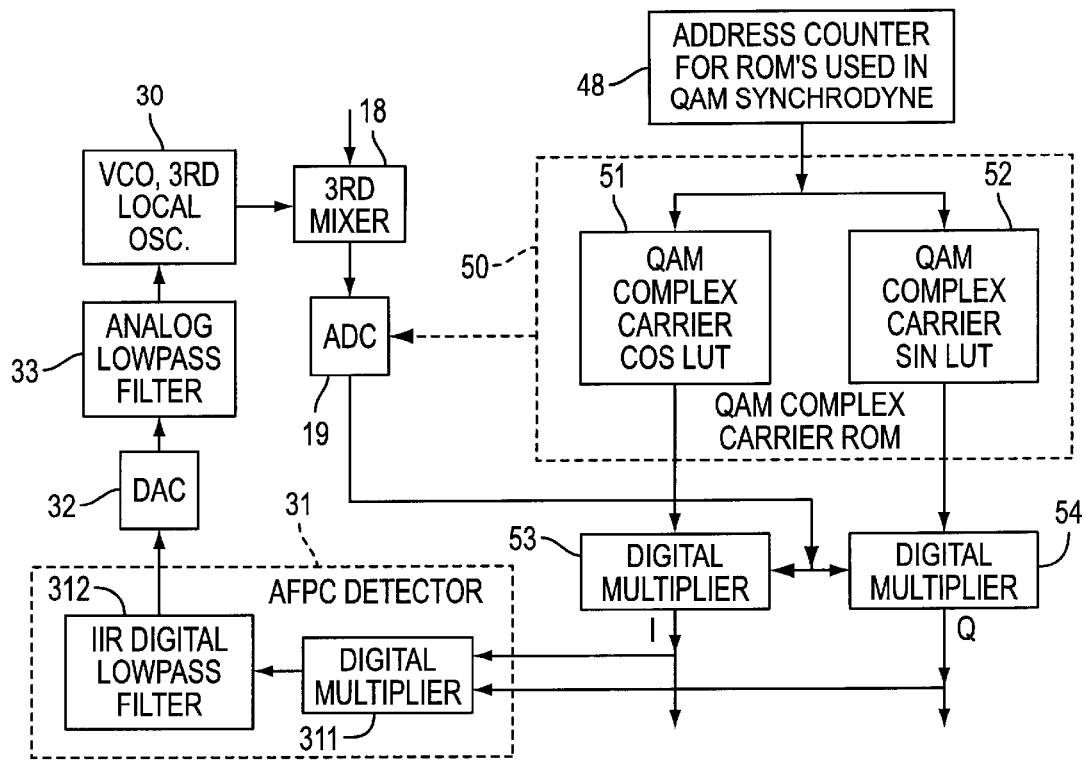
FIG. 8 is a block schematic diagram showing in greater detail circuitry that can be used in FIG. 1 for synchrodyning QAM DTV signal to baseband in the digital regime, which synchrodyning circuitry is believed to be novel.

FIG. 8 shows in more detail the digital circuitry 5 for synchrodyning QAM DTV signals to baseband. The QAM synchrodyning circuitry 5 includes a read-only memory 50 comprising a portion 51 and a portion 52, each addressed by the address counter 48 previously described with reference to FIG. 7. The portion 51 of the ROM 50 stores a cosine look-up table (LUT) to describe the real component of the complex digital carrier the synchrodyning circuitry 5 uses for synchrodyning QAM DTV signals to baseband. The portion 52 of the ROM 50 stores a sine look-up table (LUT) to describe the imaginary component of the complex digital carrier the synchrodyning circuitry S uses for synchrodyning QAM DTV signals to baseband. Digital multipliers 53 and 54 are included within the FIG. 8 synchrodyning circuitry 5 for QAM DTV signals. In order that the latent delay in generating product signals be minimized, the digital multipliers 53 and 54 are preferably constructed using read-only memory, rather than using logic circuitry and registers for multiplier and multiplicand signals. The digital multiplier 53 multiplies the digitized final I-F signal from the ADC 19 by the real component of the complex digital carrier read from the portion 51 of the ROM 50 storing the cosine look-up table. The digital product output signal from the digital multiplier 53 supplies the respective in-phase (I) baseband output signal from the synchrodyning circuitry 5. The digital multiplier 54 multiplies the digitized final I-F signal from the ADC 19 by the imaginary component of the complex digital carrier read from the portion 52 of the ROM 50 storing the sine look-up table. The digital product output signal from the digital multiplier 54 supplies the respective quadrature-phase (Q) baseband output signal from the synchrodyning circuitry 5.

FIG. 8 also shows in more detail the type of the AFPC detector 31 that is preferred, constructed to employ an AFPC method generally attributed to Costas. The AFPC detector 31 includes a digital multiplier 311 for multiplying together the in-phase (I) and quadrature-phase (Q) baseband output signals from the synchrodyning circuitry 5 to develop a digital product signal. The AFPC detector 31 further includes a digital lowpass filter 312 for selecting a baseband error signal for application to the DAC 32. The lowpass filter 312 is preferably a recursive filter of infinite-impulse-response (IIR) type. The lowpass filter 312 eases the dynamic range and sampling rate requirements on the DAC 32, but the product signal from the multiplier 311 is applied to the DAC 32 without being lowpass filtered in alternative embodiments of the invention.

The AFPC of the third local oscillator 30 automatically adjusts the phasing of the final I-F frequency vis-à-vis the complex digital carrier such that partial product that would be developed by multiplying the real component of the QAM signal by the imaginary component of the complex digital carrier will be zero-valued, which avoids the need for a digital multiplier to develop that partial-product signal.

The automatic adjustment of the phasing of the final I-F frequency vis-à-vis the complex digital carrier is at the same time such that partial product that would be developed by multiplying the imaginary component of the QAM signal by the real component of the complex digital carrier will be zero-valued, which avoids the need for a digital multiplier to develop that partial-product signal. Accordingly, the multiplication of the QAM signal by complex digital carrier that is normally carried out by four component digital multipliers is in FIG. 8 carried out by only two component digital multipliers 53 and 54. The two component digital multipliers 53 and 54 use only real QAM signal as multiplicand input signals.

It is desirable that the digitization of the final I-F signal be done by a single analog-to-digital converter operative on real final I-F signal alone, rather than having to track the combined operation of a mixer for generating real final I-F signal and an analog-to-digital converter for digitizing the real final I-F signal with combined operation of a mixer for generating imaginary final I-F signal and an analog-to-digital converter for digitizing the imaginary final I-F signal. Previously this was done using a mixer for generating real final I-F signal and an analog-to-digital converter for digitizing the real final I-F signal, then generating the imaginary final I-F signal as Hilbert transform filter response to the real final I-F signal. Practical digital filters limited the lowest frequency of the system function for Hilbert transformation to about one megaHertz.

Accordingly, QAM carrier in the final I-F signal had to be above 3.69 MHz or so, 4.04 MHz (one-and-a-half times QAM symbol rate) and 5.38 MHz (twice symbol rate) being the usual choices. Elimination of the multipliers receiving imaginary QAM signal as multiplicand input signals allows the Hilbert transform filter to be dispensed with and allows the QAM carrier in the final I-F signal to be of lower frequency, such as 2.69 MHz. This lower-frequency system function for the QAM signal reduces the likelihood of digitization error arising from timing error in the sampling process preliminary to digitization. Sampling at $21.52*10^6$ samples per second will sample even the highest-frequency components of the QAM signal (at 5.38 MHz) a least four times per cycle.

Figure 9:
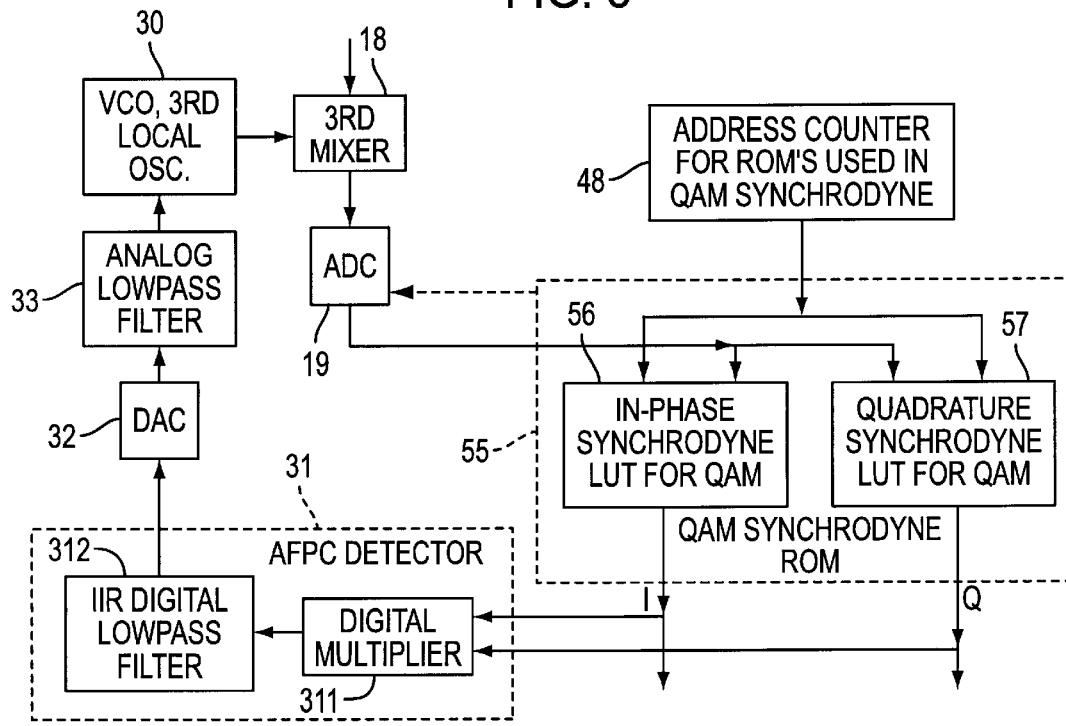
FIG. 9 is a block schematic diagram showing modified FIG. 8 circuitry that alternatively can be used in FIG. 1 for synchrodyning QAM DTV signal to baseband in the digital regime, which synchrodyning circuitry is believed to be novel.

FIG. 9 shows a modification that can be made in the FIG. 8 circuitry for synchrodyning QAM DTV signals to baseband in the digital regime. A read-only memory 55 comprising portions 56 and 57, each addressed by the address counter 48 previously described with reference to FIG. 7. Since there are only two component digital multipliers in the FIG. 8 circuitry, which multipliers 53 and 54 are preferably constructed using ROM, and since each of these ROMs receives multiplicand from a respective portion 51 or 52 of the ROM 50 for complex digital carrier, the combined operations of the digital multiplier 53 and the portion 51 of the ROM 50 can be performed by the portion 56 of the ROM 55 storing a look-up table storing the in-phase (I) baseband output signal for the synchrodyning circuitry 5 that results when QAM final I-F signal is synchrodyned to baseband. Furthermore, the combined operations of the digital multiplier 54 and the portion 52 of the ROM 50 can be performed by the portion 57 of the ROM 55 storing a look-up table storing the quadrature-phase (Q) baseband output signal for the synchrodyning circuitry 5 that results when QAM final I-F signal is synchrodyned to baseband. Not only is there a saving in the FIG. 9 synchrodyning circuitry 5 of overall amount of ROM as compared to the FIG. 8 synchrodyning circuitry 5, there is complete avoidance of any round-off errors in the multiplicand signals supplied to the multipliers 53 and 54 from the portions 51 and 52 of the ROM 50.

Figure 10:
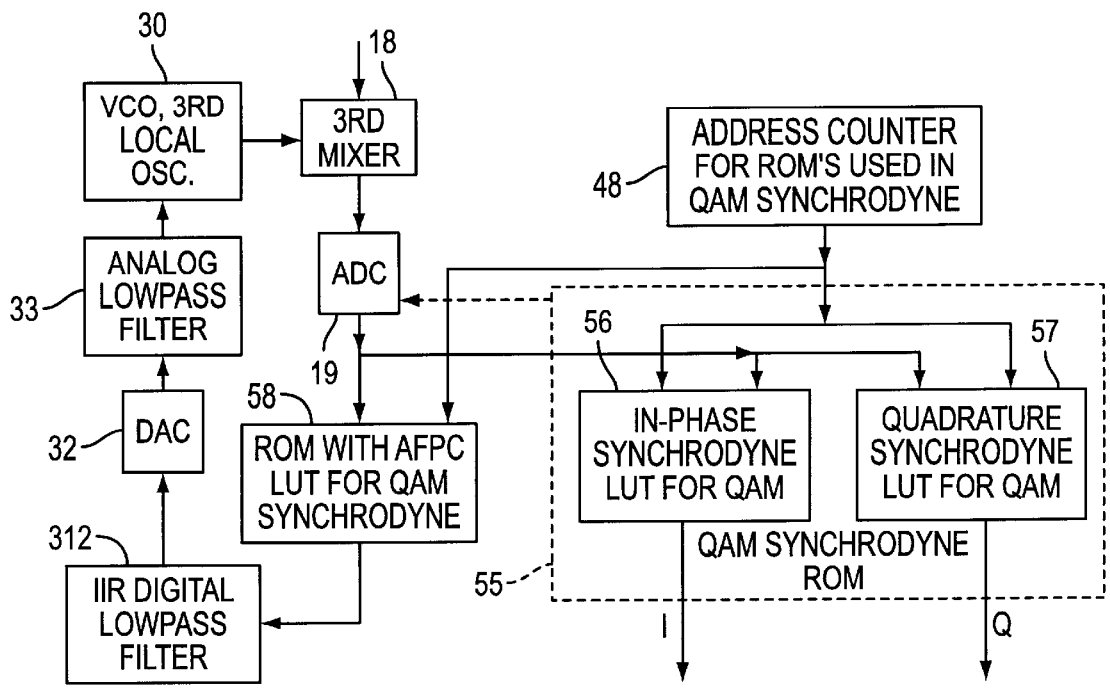
FIG. 10 is a block schematic diagram showing further modified FIG. 8 circuitry that alternatively can be used in FIG. 1 for synchrodyning QAM DTV signal to baseband in the digital regime, which synchrodyning circuitry is believed to be novel.

FIG. 10 shows another modification that can be made in the FIG. 8 circuitry in addition to the modifications shown in FIG. 9. A read-only memory 58 addressed by the address counter 48 stores a look-up table for a signal corresponding to the product signal that the digital multiplier 311 of FIG. 9 supplies responsive to its multiplying together the signals read from the portions 56 and 57 of the ROM 55. In FIG. 10 the multiplier 311 is dispensed with, and instead of the product signal from the digital multiplier 311 the IIR low-pass filter 312 receives signal read from the ROM 58.

Figure 11:
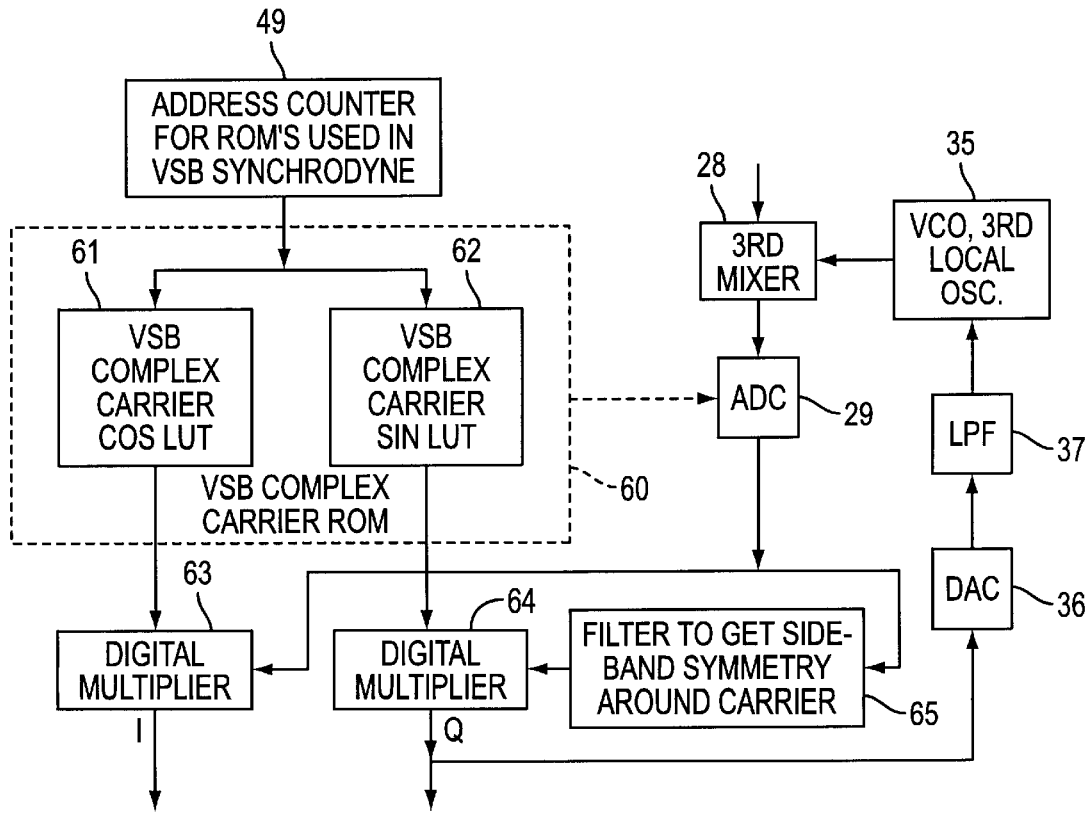
FIG. 11 is a block schematic diagram showing in greater detail circuitry that can be used in FIG. 1 for synchrodyning VSB DTV signal to baseband in the digital regime, which synchrodyning circuitry is believed to be novel.

FIG. 11 shows in more detail the digital circuitry 6 for synchrodyning VSB DTV signals to baseband. The VSB synchrodyning circuitry 6 includes a read-only memory 60 comprising a portion 61 and a portion 62, each addressed by the address counter 49 previously described with reference to FIG. 7. The portion 61 of the ROM 60 stores a cosine look-up table (LUT) to describe the real component of the complex digital carrier the synchrodyning circuitry 6 uses for synchrodyning VSB DTV signals to baseband. The portion 62 of the ROM 60 stores a sine look-up table (LUT) to describe the imaginary component of the complex digital carrier the synchrodyning circuitry 6 uses for synchrodyning VSB DTV signals to baseband. Digital multipliers 63 and 64 are included within the FIG. 11 synchrodyning circuitry 6 for VSB DTV signals. In order that the latent delay in generating product signals be minimized, the digital multipliers 63 and 64 are preferably constructed using read-only memory, rather than using logic circuitry and registers for multiplier and multiplicand signals. The digital multiplier 63 multiplies the digitized final I-F signal from the ADC 19 by the real component of the complex digital carrier read from the portion 61 of the ROM 60 storing the cosine look-up table. The digital product output signal from the digital multiplier 63 supplies the respective in-phase (I) baseband output signal from the synchrodyning circuitry 6.

The digitized final I-F signal from the ADC 29 is supplied to a FIR digital filter 65 that provides in its system response symmetry of sideband response in the portion of the final I-F signal frequency spectrum immediately surrounding the (pilot) carrier frequency. The digital multiplier 64 multiplies the response from the digital filter 65 by the imaginary component of the complex digital carrier read from the portion 62 of the ROM 60 storing the sine look-up table. The digital product output signal from the digital multiplier 64 supplies the respective quadrature-phase (Q) baseband output signal from the synchrodyning circuitry 6.

The AFPC of the third local oscillator 35 automatically adjusts the phasing of the final I-F frequency vis-à-vis the complex digital carrier such that partial product that would be developed by multiplying the real component of the VSB signal by the imaginary component of the complex digital carrier will be zero-valued, which avoids the need for a digital multiplier to develop that partial-product signal. The automatic adjustment of the phasing of the final I-F frequency vis-a-vis the complex digital carrier is at the same time such that partial product that would be developed by multiplying the imaginary component of the VSB signal by the real component of the complex digital carrier will be zero-valued, which avoids the need for a digital multiplier to develop that partial-product signal. Accordingly, the multiplication of the VSB signal by complex digital carrier that is normally carried out by four component digital multipliers is in FIG. 11 carried out by only two component digital multipliers 63 and 64.

The two component digital multipliers 63 and 64 use only real VSB signal as multiplicand input signals, so there is no need for generating an imaginary VSB signal. There is accordingly no need for a Hilbert transform filter to generate imaginary VSB signal, and the constraint that the lowest frequency in the final I-F signal be above 1 MHz to permit practical implementation of a Hilbert transform filter is not imposed on the receiver design. Previously, the practical implementation of the Hilbert transform filter kept VSB carrier in the final I-F signal 1.076 MHz or higher if the vestigial sideband were located below carrier in frequency, 1.345 MHz being a particularly desirable choice because it facilitates the storage of digital carrier in ROM. If the vestigial sideband were located above carrier in frequency, the practical implementation of the Hilbert transform filter kept VSB carrier in the final I-F signal above 6.4 MHz. A carrier of 7.17 MHz or of 8.07 MHz was favored, to facilitate the storage of digital carrier in ROM. Elimination of the Hilbert transform filter allows the VSB carrier in the final I-F signal to be of lower frequency. However, this is not of much practical use if the vestigial sideband is below the carrier in frequency. This is because folding of the frequency spectrum of the final I-F signal has to be avoided when generating quadrature-phase (Q) baseband output signal in the synchrodyning circuitry 6, in order that AFPC of the third local ocillator 35 operate properly.

Locating the vestigial sideband above carrier in frequency in the final I-F signal is favored, because such location reduces the likelihood of digitization error arising from timing error in the sampling process preliminary to digitization. This comes about because the principal components of the VSB signal are lower in frequency. The elimination of the Hilbert transform filter allows the VSB carrier in the final I-F signal to be 5.38 MHz, so the vestigial sideband folds into the other sideband to establish a "brick-wall" response that reduces the need for baseband equalization near symbol frequency. The ideal training signal stored by the filter-parameter computer 104 for comparison with PN sequences extracted from the data field synchronizing (DFS) signals can therefore consist of PN sequences rather than a roll-off filter response to PN sequences.

Figure 12:
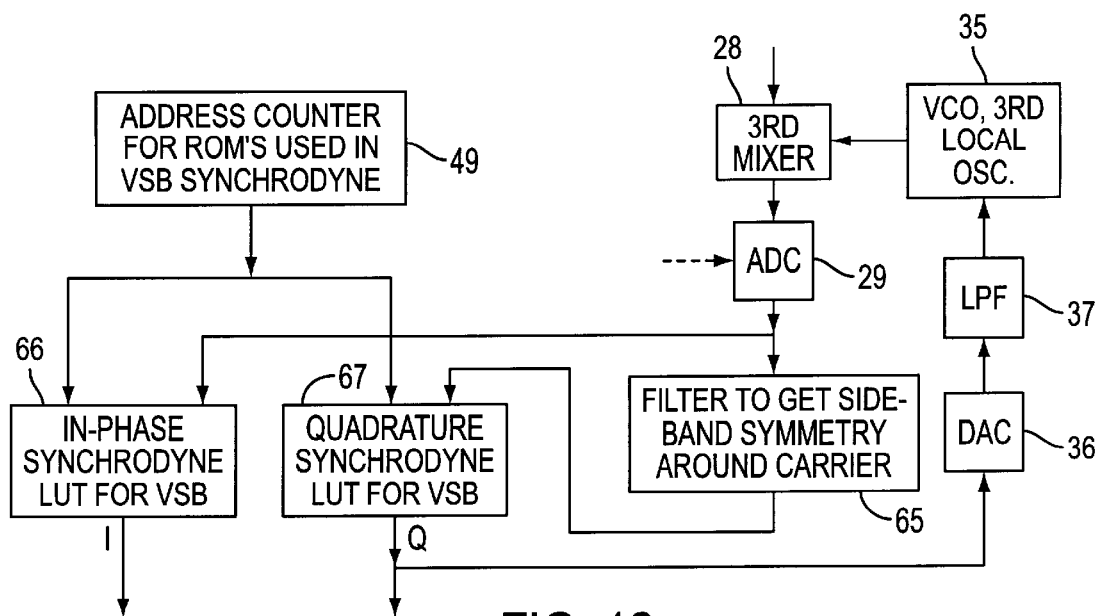
FIG. 12 is a block schematic diagram showing modified FIG. 11 circuitry that alternatively can be used in FIG. 1 for synchrodyning VSB DTV signal to baseband in the digital regime, which synchrodyning circuitry is believed to be novel.

FIG. 12 shows a modification that can be made in the FIG. 11 circuitry for synchrodyning VSB DTV signals to baseband in the digital regime. A read-only memory 65 comprising portions 66 and 67, each addressed by the address counter 49 previously described with reference to FIG. 7. Since there are only two component digital multipliers in the FIG. 11 circuitry, which multipliers 63 and 64 are preferably constructed using ROM, and since each of these ROMs receives multiplicand from a respective portion 61 or 62 of the ROM 60 for complex digital carrier, the combined operations of the digital multiplier 63 and the portion 61 of the ROM 60 can be performed by the portion 66 of the ROM 65 storing a look-up table storing the in-phase (I) baseband output signal for the synchrodyning circuitry 6 that results when VSB final I-F signal is synchrodyned to baseband. Furthermore, the combined operations of the digital multiplier 64 and the portion 62 of the ROM 60 can be performed by the portion 67 of the ROM 65 storing a look-up table storing the quadrature-phase (Q) baseband output signal for the synchrodyning circuitry 6 that results when VSB final I-F signal is synchrodyned to baseband. Not only is there a saving in the FIG. 12 synchrodyning circuitry 6 of overall amount of ROM as compared to the FIG. 11 synchrodyning circuitry 6, there is complete avoidance of any round-off errors in the multiplicand signals supplied to the multipliers 63 and 64 from the portions 61 and 62 of the ROM 60.

The digital filter 65 is not required if the DTV transmitter has filtering to suppress data signal components in the frequency region within a few tens or hundreds of Hertz from carrier. However, if the DTV transmitter does not employ such filtering and the roll-off of the vestigial sideband begins in the portion of the other sideband adjoining carrier frequency, the digitized final I-F signal must be filtered so its system response in the frequency region surrounding carrier exhibits a symmetrical sideband structure on each side of carrier frequency. Otherwise, the low-frequency components of data signal will appear in the quadrature-phase (Q) baseband output signal and will undesirably affect AFPC of the VCO 35. The digital filter 65 can be one that boosts the response of the vestigial sideband in the carrier region or, alternatively, can be one that rolls off the response of the other sideband. This other sideband will hereinafter be referred to as the "full sideband" even though it generally exhibits some roll off in frequency characteristic in the carrier region. The digital filter 65 that boosts VSB response in the carrier region increases pilot carrier amplitude, tending to improve phase-lock in the AFPC loop of the VCO 35.

However, the digital filter 65 that rolls off the response of the other sideband advantageously reduces the bandwidth of the quadrature-phase (Q) baseband output signal to ease the requirements on the DAC 36. Both types of filter 65 present some design problems with regard to symmetry around carrier frequency of passband for noise, such symmetry being desirable to reduce noise jitter in the AFPC loop of the VCO 35.

The digital filter 65 has latent delay associated with it, which delay must be compensated for, in order that the FIG. 11 digital multiplier 63 or the FIG. 12 ROM 66 supplies the in-phase (I) baseband output signal from the synchrodyning circuitry 6 without admixture of quadrature-phase (Q) baseband output signal. The delay can be compensated for by introducing delay into the ADC 29 output signal as applied to the multiplier 63 in FIG. 11 or to the FIG. 12 ROM 66 in FIG. 12. Alternatively, the delay can be compensated for by adjusting the difference between the digital carrier phases stored in the portions 61 and 62 of the ROM 60.

The fact that the latent delay of the digital filter 65 is included within the AFPC loop of the VCO 35 means that, in order that loop stability be preserved, the time constant of the lowpass filter 37 has to be somewhat larger than would otherwise be necessary. This reduces the capability of the AFPC'd VCO 35 to track received carrier phase during rapid fading conditions. Arrangements can be made to move the filtering that provides symmetry of sideband response in the portion of the final I-F signal frequency spectrum immediately surrounding the (pilot) carrier frequency, so that the filtering is not included within the AFPC loop of the VCO 35.

Figure 13:
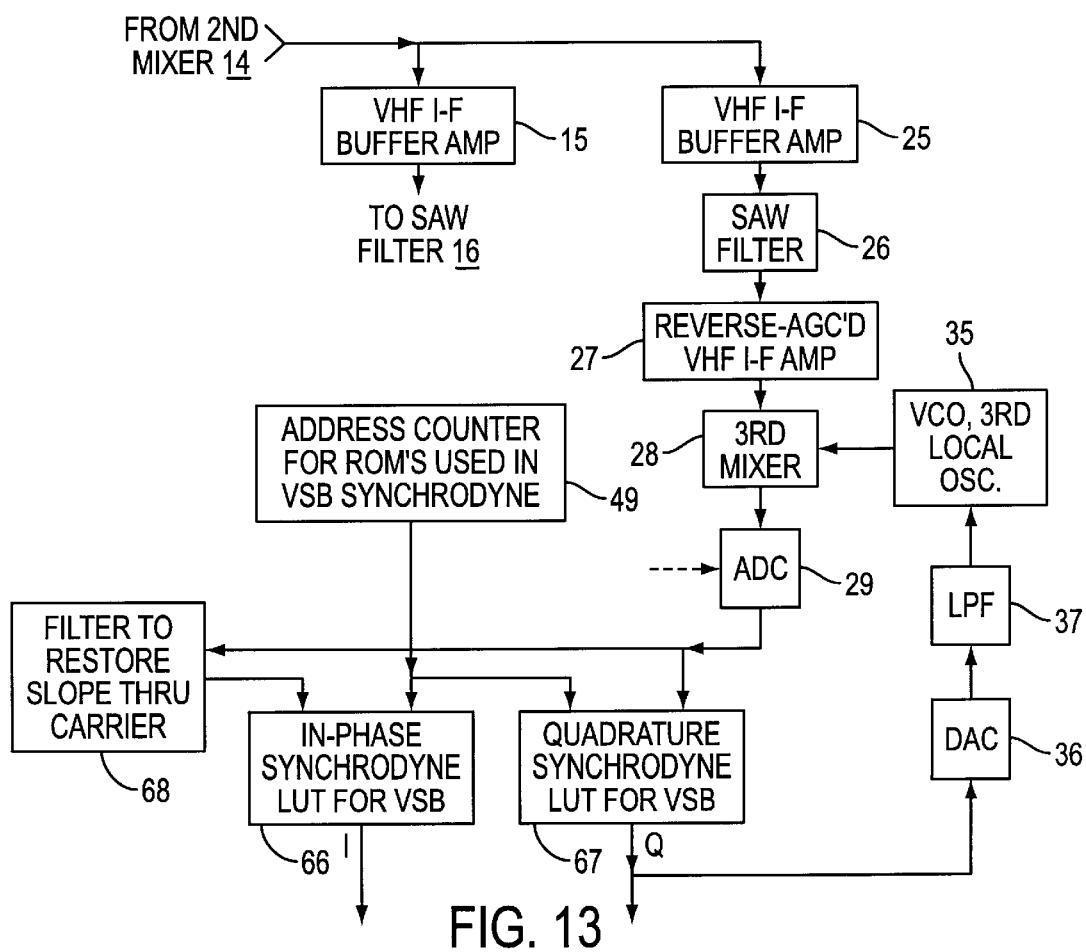
FIG. 13 is a block schematic diagram showing another modification that can alternatively be used in FIG. 1 for synchrodyning VSB DTV signal to baseband in the digital regime, which synchrodyning circuitry is believed to be novel.

FIG. 13 shows one way to accomplish this, so the digitized final I-F signal supplied from the ADC 29 can be applied directly to the ROM 67 as partial input address rather than being applied via the lowpass filter 37. The third mixer 28 is no longer supplied VHF I-F signal from the same VHF I-F amplifier 17 as the third mixer 18.

Instead, the third mixer 28 receives VHF I-F signal the following way in FIG. 13. A VHF I-F buffer amplifier 25 responds to VHF I-F output signal from the second mixer 14 to drive a surface-acoustic-wave filter 26 from an optimal source impedance. The SAW filter 26 has a response that establishes Nyquist slope for the VSB VHF I-F signal and that boosts the full sideband response to provide an output signal that has flat spectral response in the region immediately surrounding carrier frequency. The SAW filter 26 response is applied as input signal to a VHF I-F amplifier 27 having as much as 80 dB gain and having automatic gain control. The AGC is preferably reverse AGC that preserves linearity despite application of gain control signal. The output signal from the VHF I-F amplifier 27 is applied to the third mixer 28 to be heterodyned with oscillations from the VCO 35 and thus downconverted in frequency to final I-F signal.

The final I-F signal has boosted full sideband response and is digitized by the ADC 29 for application to the ROM 67. The digitized final I-F signal from the ADC 29 is digitally filtered by an FIR digital filter 68 to apply linear slope through the carrier region, which slope is down 6 dB at carrier frequency, and the filter 68 response is then applied to the ROM 68 as partial input addressing. The latent delay through the FIR digital filter 68 is compensated for by adjusting the difference between the digital carrier phases stored in the portions 61 and 62 of the ROM 60.

Alternatively, the digitized final I-F signal from the ADC 29 can be applied directly to the FIR digital filter 68. The boost in the carrier region of the digitized final I-F signal spectrum will cause boost near zero frequency in the in-phase (I) baseband output signal from the synchrodyning circuitry 6. The equalization and ghost-cancellation filtering 90 will remove the boost near zero frequency.

Figure 14:
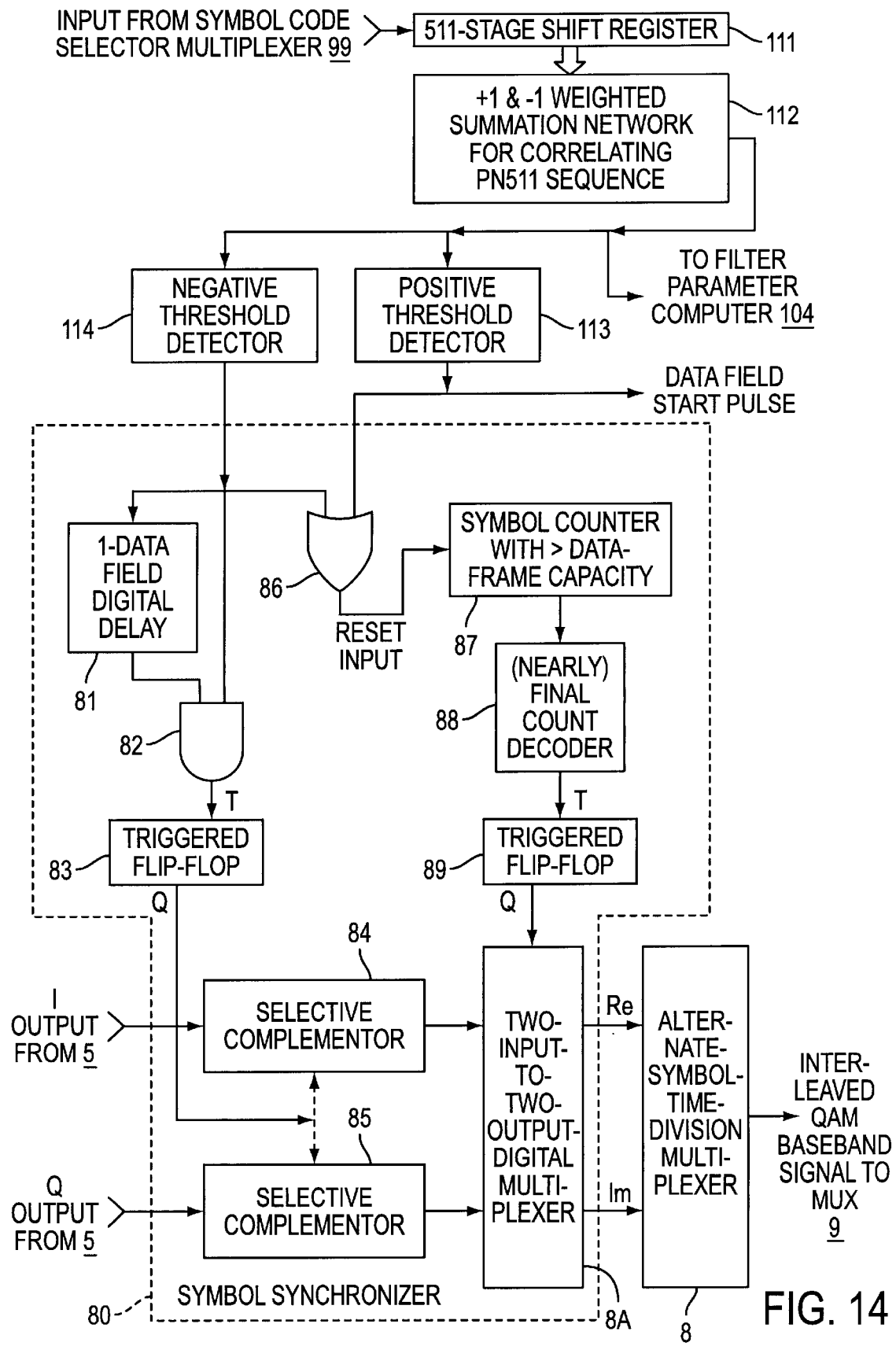
FIG. 14 is a block schematic diagram showing in detail data synchronization recovery circuitry used in the FIG. 1 QAM/VSB DTV signal receiver to implement symbol synchronization during QAM signal reception in accordance with further aspects of the invention.

FIG. 14 shows a way to implement the symbol synchronization circuitry 80 used in FIG. 1 after the digital synchrodyne circuitry 5 for detecting baseband QAM signals. The symbol code selector multiplexer 99 output signal supplies serial shift input signal to a 511-stage shift register 111, as may include the output latch of the multiplexer 99. The shift register 111 operates as a serial-in/parallel-out register to supply 511 parallel samples to a weighted summation network 112 of a correlation filter for the PN511 sequence prescribed by the ATSC standard for inclusion in the initial data segment of each data field. The weighted summation network 112 adds to its total response those samples from the shift register 111 that should correlate with ONE values of this PN511 sequence when it fills the 511 shift register 111 stages, and the weighted summation network 112 subtracts from its total response those samples from the shift register 111 that should correlate with ZERO values of this PN511 sequence when it fills the 511 shift register 111 stages.

The total response of the weighted summation network 112 can be supplied to the microcomputer 104 that calculates the filtering parameters for the adaptive filters of the equalization and ghost-cancellation filtering 90. In such case the shift register 111 and the weighted summation network 112 could be considered to be included as part of the PN sequence extraction circuitry 105.

The total response of the weighted summation network 112 exhibits positive correlation for the PN511 sequence prescribed by the, ATSC standard for inclusion in the initial data segment of each data field occupying the 511 shift register 111 stages and for ghosts of the PN511 sequence. A threshold detector 113 supplies an output pulse when the total response of the weighted summation network 112 exceeds a positive threshold value that is high enough that there are no pulse responses to ghosts of the PN511 sequence, but low enough that some irregularities in the PN511 sequence owing to brief impulse noise will not prevent pulse responses to the PN 511 sequence. The pulse response from the threshold detector 113 can be used as a DATA FIELD START PULSE for resetting the segment-count portion of the sample count from the sample counter 103, in place of response from one of the match filters 102. When the DTV signal receiver is in its QAM detection mode, the PN511 sequence prescribed by the ATSC standard for inclusion in the initial data segment of each data field will appear in the filtering 90 response if symbol synchronization is correct. The resulting generation of pulse response from the threshold detector 113 signals that symbol synchronization is correct.

When the DTV signal receiver is in its QAM detection mode, if symbol synchronization is incorrect owing to VCO 30 being locked at 180° from correct phasing, the complement of PN511 sequence prescribed by the ATSC standard for inclusion in the initial data segment of each data field will appear in the filtering 90 response. The total response of the weighted summation network 112 exhibits anti-correlation negative correlation for this complementary PN511 sequence occupying the 511 shift register 111 stages and for ghosts of the PN511 sequence. A threshold detector 114 supplies an output pulse when the total response of the weighted summation network 112 dips below a negative threshold value that is low enough that there are no pulse responses to ghosts of the complementary PN511 sequence, but high enough that some irregularities in the complementary PN511 sequence owing to brief impulse noise will not prevent pulse responses to the complementary PN511 sequence. The generation of pulse response from the threshold detector 114 signals that symbol synchronization is incorrect owing to the VCO 30 being locked at 180° from correct phasing, resulting in the polarity of symbols being inverted from what it should be. The occurrence of output pulse from the threshold detector 114 can be used to invert the polarity of symbols again, to correct symbol polarity.

The possibility of erroneous output pulse from the threshold detector 114 is further forestalled by applying undelayed threshold detector 114 response and that response as delayed for the duration of one data field interval in delay circuitry 81 as input signals to a two-input AND gate 82. AND gate 82 output will pulse to ONE only when the negative threshold detector 114 repeatedly detects the complement of the PN511 sequence used in the field synchronization code, each later time of detection being later than the preceding time of detection by exactly the interval of a data field.

An edge of this pulse will trigger a triggered flip-flop 83 to change the state of its true (Q) output signal. The true output signal of flip-flop 83 controls whether or not the polarities of the in-phase and quadrature-phase signals received from the digital synchrodyne circuitry 5 are reversed as those signals are reproduced in the output signals from the selective complementors 84 and 85. Each of the selective complementors 84 and 85 comprises a battery of NOR gates, a respective one for each bit of the signal that selective complementor receives from the digital synchrodyne circuitry 5. Since there should be virtually no possibility of erroneous output pulse from the negative threshold detector 114, in order to reduce DTV receiver cost a bit, the flip-flop 83 can be triggered directly by such output pulse without using the error rejection filter comprising elements 81 and 82.

A two-input OR gate 86 receives the pulse responses of the positive threshold detector 113 and of the negative threshold detector 114 as respective input signals and will respond with a ONE-going pulse during the initial data segment of each data field, providing the in-phase and quadrature-phase signals received from the digital synchrodyne circuitry 5 are respectively real and imaginary baseband QAM signals. This ONE-going pulse resets a symbol counter 87 with the capability of counting a number of symbols greater than the number of symbols in a data field, preferably a number of symbols greater than the number of symbols in a data frame. The delay circuitry 81 is conveniently constructed using a read-and-then-write random-access memory (RAM), and the symbol counter 87 can be designed so the less significant bits of its count are suitable for addressing the RAM.

A decoder 88 generates a ONE when final count before count rollover is reached (or in alternative design) when a somewhat smaller count is reached. An edge of the ONE-going pulse supplied by the decoder 88 will trigger a triggered flip-flop 89 to change the state of its true (Q) output signal. The true output signal of flip-flop 89 controls whether a two-input-to-two-output digital multiplexer 8A will generate the real and imaginary baseband QAM signals supplied to the alternate-symbol time-division multiplexer 8 from the in-phase and quadrature-phase signals supplied by the selective complementors 84 and 85, respectively, or whether the multiplexer 8A will generate the real and imaginary baseband QAM signals supplied to the multiplexer 8 from the quadrature-phase and in-phase signals supplied by the selective complementors 85 and 84, respectively.

If the digital synchrodyne circuitry 5 detects with correct carrier phasing or with carrier phasing 180° from desired phase, the OR gate 86 will reset the symbol counter 87, so the decoder 88 will not generate a ONE-going pulse to trigger a change in the true output state of the flip-flop 89. Normally, the PN511 sequence or its complement will be detected in the initial data segment of each data field to reset the symbol counter 87. If the PN511 sequence or its complement is not detected in the initial data segment of one data field (e. g., owing to the QAM signal being accompanied by impulse noise), likely it will be detected in the initial data segment of the following data field, to reset the symbol counter 87 so the decoder 88 will not generate a ONE-going pulse to trigger a change in the true output state of the flip-flop 89. There will be no change in regard to which of the in-phase and quadrature-phase signals respectively supplied by the selective complementors 84 and 85 the multiplexer 8A will respond to for generating the real and imaginary baseband QAM signals supplied to the alternate-symbol time-division multiplexer 8.

If the digital synchrodyne circuitry 5 detects with carrier phasing 90° or 270° from desired phase, the OR gate 86 will not generate a ONE-going pulse to reset the symbol counter 87 during the initial data segments of two consecutive data fields. The symbol counter 87 will reach the count that causes the decoder 88 to generate a ONE-going pulse that triggers a change in the true output state of the flip-flop 89. The multiplexer 8A will switch which of the in-phase and quadrature-phase signals respectively supplied by the selective complementors 84 and 85 the multiplexer 8A responds to for generating the real and imaginary baseband QAM signals supplied to the alternate-symbol time-division multiplexer 8.

Figure 15:
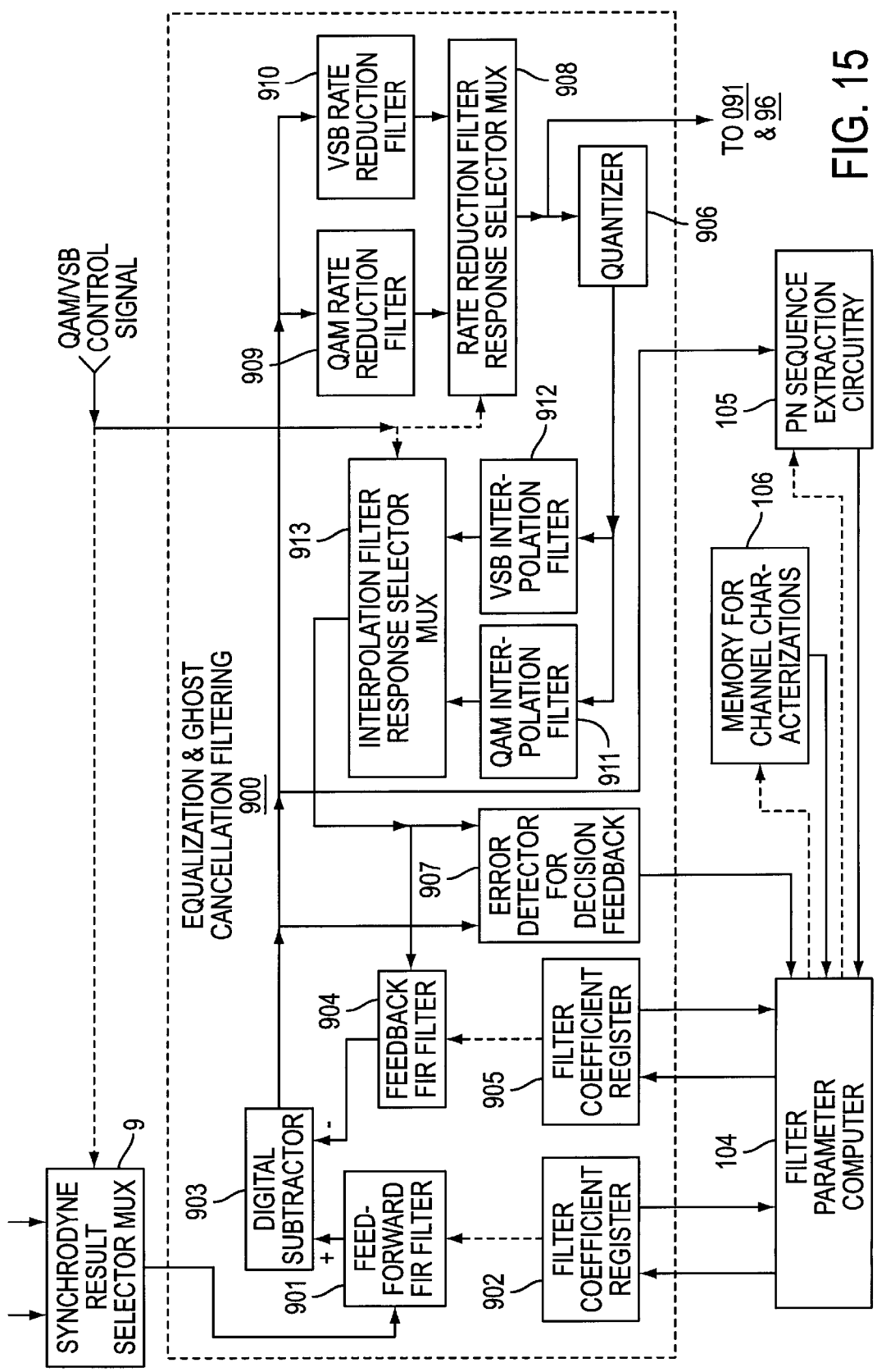
FIG. 15 is a block schematic diagram of novel equalization and ghost-cancellation filtering preferably used in the FIG. 2 QAM/VSB DTV signal receiver circuitry.

FIG. 15 shows equalization and ghost-cancellation filtering 900, which improves over off-the-shelf equalization and ghost-cancellation filtering 90. Like known equalization and ghost-cancellation filtering, the equalization and ghost-cancellation filtering 900 comprises a finite-impulse-response (FIR) digital filter 901 having filtering coefficients stored in a temporary storage register 902, a digital subtractor 903, an FIR digital filter 904 having filtering coefficients stored in a temporary storage register 905, a quantizer 906, and an error detector 907 for supplying decision feedback information to the filter-parameter computer 104. The FIR filter 901 is operated in as a feedforward FIR filter for suppressing near ghosts. The feedforward FIR filter 901 helps suppress pre-ghosts, multipath responses that are received earlier than the principal DTV signal is received.

The subtractor 903, the FIR filter 904 and the quantizer 906 are connected to provide an infinite-impulse-response (IIR) filter. The FIR filter 904, which has filtering coefficients stored in a temporary storage register 905, is operated as a feedback FIR filter in this IIR filter. This IIR filter helps suppress post-ghosts, multipath responses that are received later than the principal DTV signal is received.

Ignoring the presence of severe noise in the difference output signal from the subtractor 903, the signal supplied to the quantizer 906 will change amongst ideal symbol code levels when convergence is achieved. The quantizer 906 suppresses noise that does not extend beyond data-slice boundaries. Accordingly, including the quantizer 906 within the feedback path in the IIR filter portion of the filtering 900 tends to speed up the final approach towards convergence to eliminate post-ghosts. These advantages are forfeited if the input signal for the feedback FIR filter 904 is taken directly from the difference output of the subtractor 903, instead of as shown in FIG. 15. These advantages also are forfeited if the IIR filter portion of the filtering 900 precedes, rather than succeeds, the feedforward FIR filter 401 in their cascade connection with each other. Including the quantizer 906 in the feedback loop also tends to stabilize the loop against spontaneous oscillation.

In the filtering 900, as in known equalization and ghost-cancellation filtering that receives oversampled input signal in order to execute channel equalization on an excess-bandwidth basis, there is rate reduction filtering of the subtractor 903 difference output signal for applying the signal at symbol rate to the quantizer 906. However, since filtering 900 is a dual-phase filter for QAM DTV signal and is a single-phase filter for VSB DTV signal, separate rate reduction filtering is provided for the two types of DTV signal. This departs from previous practice and is more particularly described as follows.

A rate-reduction-filter response selector multiplexer 908 is controlled by the QAM/VSB CONTROL SIGNAL. Responsive to the QAM/VSB CONTROL SIGNAL indicating that a VSB DTV signal is not being received, the multiplexer 908 applies to the quantizer 906 a quantizer input signal that corresponds to the response of a QAM rate-reduction filter 909. Responsive to the QAM/VSB CONTROL SIGNAL indicating that a VSB DTV signal is being received, the multiplexer 908 applies to the quantizer 906 a quantizer input signal that corresponds to the response of a VSB rate-reduction filter 910. Since filtering 900 is a single-phase filter for VSB DTV signal, the VSB rate-reduction filter 910 is an FIR lowpass digital filter, the response of which is a weighted summation with symmetric kernel of a plurality of successive samples of the subtractor 903 difference output signal.

The QAM rate-reduction filter 909 is an FIR lowpass digital filter, the response of which is a weighted summation with symmetric kernel of a plurality of samples of the subtractor 903 difference output signal. However, since filtering 900 is a dual-phase filter for QAM DTV signal, the weighted summation in the QAM rate-reduction filter 909 is of alternate samples of the subtractor 903 difference output signal, rather than successive samples. So the QAM rate-reduction filter 909 is unusual.

The output signal from the feedback FIR filter 904 must be supplied as subtrahend input signal to the digital subtractor 903 in a manner that will support the dual-phase filtering for QAM DTV signal and the single-phase filtering for VSB DTV signal. This is best implemented by operating the feedback FIR filter 904 with over-sampling similar to that employed in the feed-forward FIR filter 901. The quantizer 906 output signal, which is sampled at Nyquist rate, has to be re-sampled to provide input signal to the feedback FIR filter 904 at this over-sampling rate. The requirements for re-sampling the quantizer 906 output signal to implement dual-phase filtering for QAM DTV signal differ from the requirements for re-sampling the quantizer 906 output signal to implement single-phase filtering for VSB DTV signal. When a VSB DTV signal is not being received, a QAM interpolation filter 911 interpolates between the current sample of the quantizer 906 output signal and the sample two sample epochs back to provide input signal for the feedback FIR filter 904 at over-sampling rate. When a VSB DTV signal is being received, a VSB interpolation filter 912 interpolates between the current sample of the quantizer 906 output signal and the preceding sample to provide input signal for the feedback FIR filter 904 at over-sampling rate. An interpolation-filter response selector multiplexer 913 is controlled by the QAM/VSB CONTROL SIGNAL. Responsive to the QAM/VSB CONTROL SIGNAL indicating that a VSB DTV signal is not being received, the multiplexer 913 applies input signal to the feedback FIR filter 904 that corresponds to the QAM interpolation filter 911 response. Responsive to the QAM/VSB CONTROL SIGNAL indicating that a VSB DTV signal is being received, the multiplexer 913 applies input signal to the feedback FIR filter 904 that corresponds to the VSB interpolation filter 912 response.

The filter-parameter computer 104 updates the contents of the temporary storage register 902 that holds the adaptive filter coefficients for the feed forward FIR filter 901. The filter-parameter computer 104 also updates the contents of the temporary storage register 905 that holds the adaptive filter coefficients for the feedback FIR filter 904. Each of the temporary storage registers 902 and 905 is dual-ported comprising a serial-in/parallel-out (or SIPO) component register and a parallel-in/parallel-out (or PIPO) component register. The initial stage of the SIPO component register can be serially written through a serial-input port; and the final output stage of the SIPO component register can be serially read through a serial-output port, which permits selective looping of the SIPO component register. Upon command, the stages of the PIPO component register are loaded in parallel from corresponding stages of the SIPO component register. The stages of the PIPO component register in the temporary storage register 902 supply their stored computer coefficients in parallel to digital multipliers in the FIR filter 901. The stages of the PIPO component register in the temporary storage register 905 supply their stored computer coefficients in parallel to digital multipliers in the FIR filter 904.

An earliest step in a preferred procedure for establishing initial filter coefficients for the FIR filters 901 and 904 extracts filter coefficients from a memory for storing the coefficients for each DTV channel the last time it was tuned. Such procedure is described, for example, in U.S. Pat. No. 5,654,765 issued Aug. 5, 1997 to Dae-Jin Kim and entitled "CHANNEL EQUALIZER FOR DIGITAL TELEVISION RECEIVER HAVING AN INITIAL COEFFICIENT STORAGE UNIT". If the currently selected DTV channel has not been previously tuned to, the initial filter coefficients for the FIR filters 901 and 904 stored in the memory are preset values. The establishment of the initial filter coefficients for the FIR filters 901 and 904 preferably contains further steps in which:

the transmission channel is characterized based upon spectral measurements on a standardized training signal, and the filtering coefficients are adjusted to complement this characterization of channel response.

More particularly, when implementing these further steps during the reception of VSB DTV signals, the digital subtractor 903 response is supplied to the PN sequence extraction circuitry 105, which separates training signal from the data field synchronizing (DFS) signal. The training PN sequence extraction circuitry 105 contains a gating circuit (not explicitly shown, but contained within the circuitry 105) responsive to the count supplied from a data segment counter (not explicitly shown, but contained within the filter-parameter computer 104). When the count indicates that a data segment of a data field containing DFS signal and/or its ghosts appears in the digitized baseband symbol coding of the digital subtractor 903 difference output signal, the gating circuit applies the data segment from the current data field to an accumulator (not explicitly shown, but contained within the circuitry 105). The accumulator combines the DFS signals and their ghosts from a plurality of fields for extracting the ghosted training signal applied to a DFT calculator (not explicitly shown, but contained within the filter-parameter computer 104). When alternate DFS signals are differentially combined in the accumulation, accumulating the DFS signals over a cycle of six data fields or some multiple thereof suppresses artifacts of co-channel NTSC interference in the accumulation result, so channel equalization is less affected by these artifacts.

ROM 106 stores the DFT of a ghost-free "ideal" training signal for VSB reception, which training signal is lowpass filtered according to the same Nyquist slope characteristic that one seeks for the upper-frequency portion of the transmission channel. This lowpass filtering of the ghost-free "ideal" training signal having its DFT stored in ROM 106 is important for minimizing inter-symbol interference. Storing the DFT of the Nyquist-filtered ghost-free training signal in ROM 106, rather than the Nyquist-filtered ghost-free training signal itself, eliminates having to calculate its DFT. DTV receivers are designed attempting to minimize inter-symbol interference by properly shaping the spectral response of the transmission channel for transmitting the symbol coding that is translated to digital baseband form for application to the filtering 900. The spectral response is preferably subjected to final shaping after most of the amplification in the receiver has been done, so there is no introduction of a significant level of out-of-band noise by subsequent amplification. The Nyquist slopes at band edge can be established by surface-acoustic-wave filtering in VHF intermediate-frequency amplifiers of the DTV receiver, for example. As the DTV receiver is tuned from one transmission channel to another, however, there will be variations from the desired passband shape, which variations arise from causes other than multipath distortion. Such variations may arise from changing tilts in antenna gain response, for example. Lowpass filtering the "ideal" training signal according to the same Nyquist slope characteristic that one seeks for the upper-frequency portion of the transmission channel provides for automatic adjustment of the filter coefficients of the adaptive channel equalizer to optimize the overall transmission channel characteristic for minimum inter-symbol interference.

A channel characterization calculator (not explicitly shown, but contained within the filter-parameter computer 104) divides the DFT of the ghosted training signal supplied from the DFT calculator with the DFT of a ghost-free training signal supplied from the ROM 106, term by term, to generate a DFT for the transmission channel. The channel characterization calculator takes the inverse discrete Fourier transform of the DFT for the transmission channel to generate a description of the filtering effects exerted within the channel, which inverse DFT results are referred to as the "channel characterization". The channel characterization represents the filter coefficients of a filter that in the time domain would correspond to the transmission channel. The filtering 900 has filter coefficients that are complementary to those of this filter that in the time domain would correspond to the transmission channel. Therefore, the cascade connection of the filtering 900 after the transmission channel provides a composite response to transmitted VSB symbol coding which response should be substantially free from inter-symbol interference and multipath distortion effects.

QAM signals may be transmitted without any training signal to support the further steps of initialization of the initial filter coefficients of the equalization and ghost-cancellaton filtering 900 (e.g., the initial filter coefficients for the FIR filters 901 and 904). If the data in the QAM signal transmitted by the cablecaster or by DBS includes the DFS signal in the initial data segment of each data field that is used in ATSC VSB DTV broadcasting, the QAM modulation responsive to the DFS signal can be used as a training signal during QAM reception. Alternatively, the QAM transmissions may include a different training signal. If the QAM signal includes a training signal, the ROM 106 is modified so that the single-bit QAM VSB control signal is applied as one of the bits of its address input signal, for selecting the Nyquist-filtered ghost-free training signal for VSB modulation or the Nyquist-filtered ghost-free training signal for QAM modulation. The cascade connection of the filtering 900 after the transmission channel provides a composite response to transmitted QAM symbol coding which response should be substantially free from inter-symbol interference and multipath distortion effects.

Rapid changes in multipath conditions will disrupt equalization and ghost cancellation, however, unless adaptation can be carried out based on information continuously derived from the data stream, rather than based on information derived from training signal intermittently introduced into the data stream. So, after initial adaptive filter coefficients for the FIR filters 901 and 904 are established, the filter-parameter computer 104 inputs the adaptive filter coefficients temporarily stored in the registers 902 and 905, then updates the adaptive filter coefficients using correction accumulation procedures. The corrections to be used in these accumulation procedures are generated as fractions of errors detected by the error detector 907 for implementing decision feedback according to methods similar to those used in the prior art. In the filtering 900, however, the error detector 907 generates decision feedback information for the filter-parameter computer 104 by differentially combining the FIR filter 904 input signal with the subtractor 903 difference output signal, rather than by differentially combining the quantizer 906 output and input signals as done in the prior art. The difference output signal from the subtractor 903 is delayed in delay compensation circuitry (not explicitly shown in FIG. 15), to compensate for the loop delay introduced by the filters 909 and 911 when receiving QAM DTV signals, and to compensate for the loop delay introduced by the filters 910 and 912 when receiving VSB DTV signals.

Deriving error signal from the subtractor 903 difference output signal before reduction in its rate facilitates updating of the adaptive coefficients for the feed-forward FIR filter 901 to secure excess-bandwidth operation. Excess-bandwidth operation is known to reduce inter-symbol interference (ISI) from observations of the performance of fixed-coefficient equalization filters. However, contrary to common belief by those skilled in the art, generating error signal for decision feedback by differentially combining the quantizer 906 output and input signals fails to secure excess-bandwidth operation. This is because filter coefficients cannot be individually optimized to reduce ISI owing to the error signal being of minimum bandwidth as established by the Nyquist rate sampling of the quantizer 906 output and input signals. The error signal for decision feedback must be excess-bandwidth in order that an adaptive equalizer will exhibit the excess-bandwidth operation that reduces ISI, it is here pointed out.

The orthogonal synchrodyne procedures used to process the real and imaginary portions of received QAM signals are sometimes carried out partially in the analog regime. For example, the third mixer may be a complex mixer supplying real and imaginary final I-F signals for digitization in separate respective analog-to-digital converters, in order to avoid the long-latent-delay digital filtering involved in real-samples-to-complex-samples conversion circuitry. In such case the channel characterization may be different for the baseband sample streams resulting from the two orthogonal synchrodyne procedures. The two sets of alternate-tap coefficients in the equalization and ghost cancellation filtering 90, especially those in the feed-forward filtering, will not necessarily correspond to each other. In such case it can be advantageous to arrange the equalizer portion of the equalization and ghost cancellation filtering 90 (e. g., the FIR feedforward filter 901 in the FIG. 15 equalization and ghost cancellation filtering 900) to be a complex filter.

The orthogonal synchrodyne procedures respectively processing the real and imaginary portions of received QAM signals have similar channel characterization in QAM/VSB DTV signal receivers that synchrodyne a single digitized final I-F signal to baseband entirely within the digital regime. The two sets of alternate-tap coefficients in the equalizer accordingly should be the same except for being staggered in time. When the adjustments to be made to weighting coefficients in the equalizer are calculated by decision feedback methods, this pairing of the two sets of alternate-tap coefficients in the equalizer facilitates the adjustments being made twice as quickly for given system rate.

Figure 16:
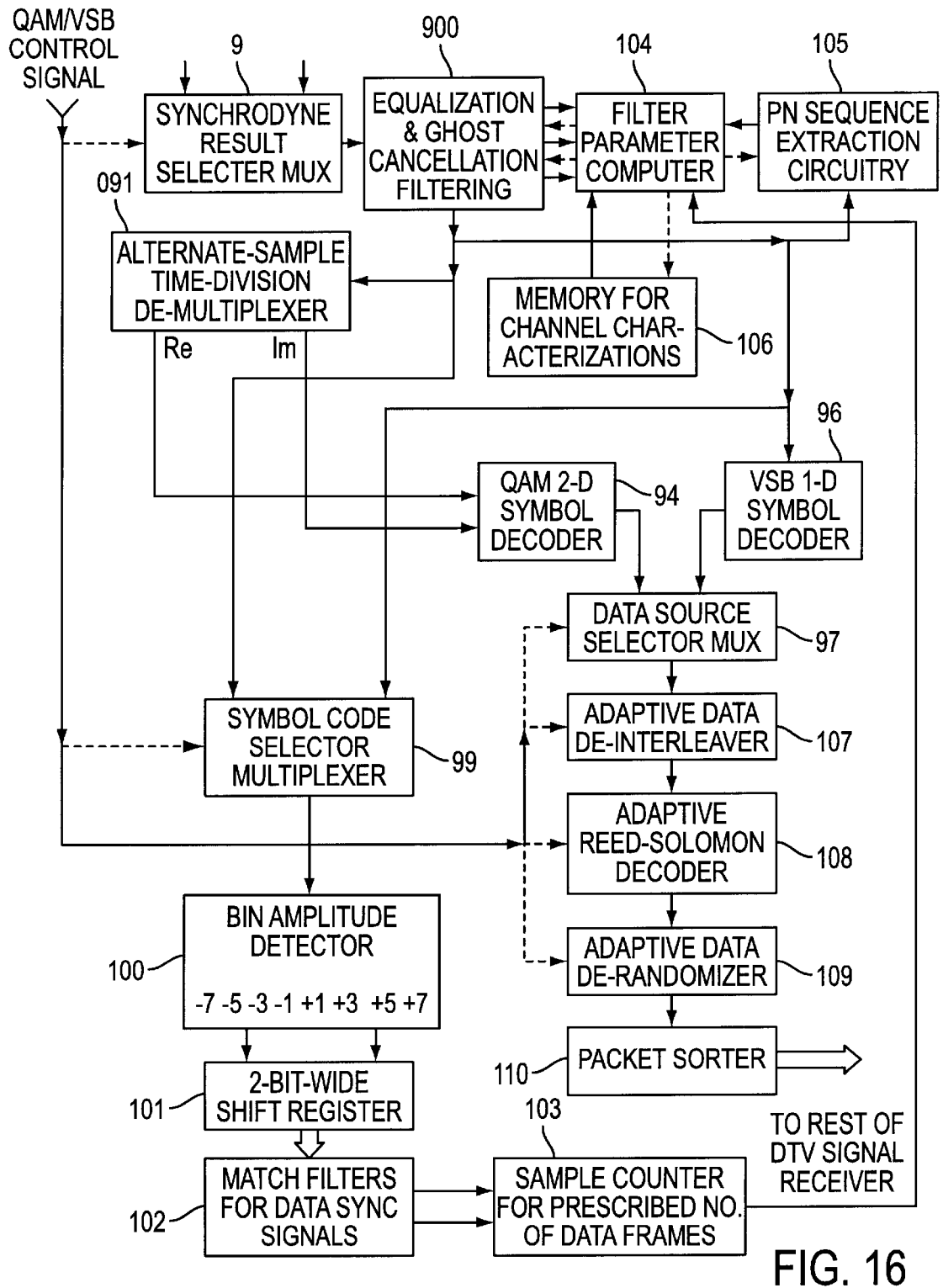
FIG. 16 is a block schematic diagram of the modifications of the FIG. 2 portions of a QAM/VSB DTV signal receiver that is a preferred embodiment of the invention that are made in connection with use of the FIG. 15 equalization and ghost-cancellation filtering.

FIG. 16 shows how the portions of the DTV receiver shown in FIG. 2 are modified when the FIG. 15 equalization and ghost-cancellation filtering 900 is used. The alternate-sample time-division de-multiplexer 91 operative at an over-sampling rate is replaced by an alternate-sample time-division de-multiplexer 091 operative at Nyquist sampling rate. The rate-change filters 92, 93 and 95 are replaced by respective direct connections. The alternate-sample time-division multiplexer 98 and the symbol code selector multiplexer 99 are dispensed with. The equalization and ghost-cancellation filtering 900 response is directly supplied to the VSB one-dimensional symbol decoder 96 and is directly supplied to the bin amplitude detector 100. When QAM DTV signals are received, the alternate-sample time-division de-multiplexer 091 separates real and imaginary signals from the equalization and ghost-cancellation filtering 900 dual-phase response for application to the QAM two-dimensional symbol decoder.

Figure 17:
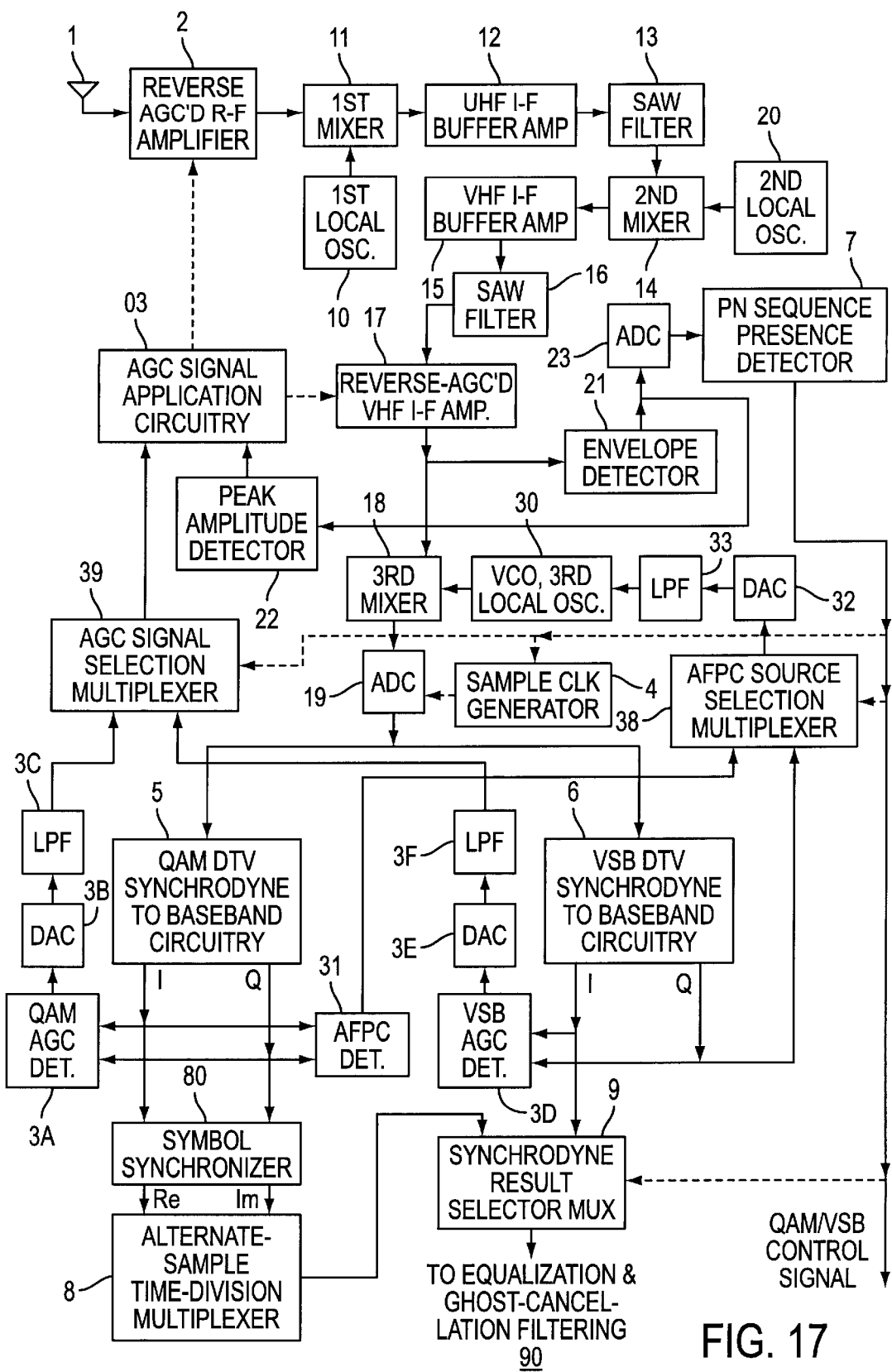
FIG. 17 is a block schematic diagram of the radio receiver portions of another type of DTV receiver embodying the invention.

FIG. 17 shows radio receiver portions used in another type of QAM/VSB DTV signal receiver embodying the invention, which radio receiver portions differ somewhat from those of FIG. 1. The FIG. 17 radio receiver differs from that of FIG. 1 in not including the third mixer 28, the ADC 29, the VCO 35, the DAC 36 and the analog lowpass filter 37. In the FIG. 17 radio receiver the third mixer 18, the ADC 19 and the VCO 30 supply digitized final I-F signal to the VSB sychrodyne circuitry 6 as well as to the QAM sychrodyne circuitry 5. The FIG. 17 radio receiver includes a multiplexer 38 for selecting the source of signal for application to the DAC 32. The multiplexer 38 makes that selection in response to the QAM/VSB CONTROL SIGNAL supplied to the multiplexer 38 from the PN sequence presence detector 7. Responsive to the QAM/VSB CONTROL SIGNAL indicating that VSB DTV signal is not currently being received, the multiplexer 38 applies the response of the AFPC detector 31 to the DAC 32 as the source of AFPC signal. Responsive to the QAM/VSB CONTROL SIGNAL indicating that VSB DTV signal is currently being received, the multiplexer 38 applies the quadrature-phase (Q) baseband signal from digital synchrodyne circuitry 6 to the DAC 32 as the source of AFPC signal. The quadrature-phase (Q) baseband signal as supplied from the digital synchrodyne circuitry 6 can either be subjected to digital lowpass filtering before application to the multiplexer 38 or directly supplied as shown in FIG. 17.

The FIG. 17 radio receiver differs further from that of FIG. 1 in that AGC signal application circuitry 3, which responds to the response of the peak amplitude detector 22, is replaced by AGC signal application circuitry 03, which responds to AGC signals dependent on signals obtained from the synchrodyne circuitry 5 and 6 as well as the response of the peak amplitude detector 22. The AGC signal application circuitry 03 uses the response of the peak amplitude detector 22 to forestall overloading in the cascade connection comprising of the R-F amplifier 2, the first mixer 11, the UHF I-F buffer amplifier 12, the second mixer 14, the VHF I-F buffer amplifier 15 and the reverse-AGC'd VHF I-F amplifier 17 if noise captures operation of the QAM sychrodyne circuitry 5 and the VSB sychrodyne circuitry 6.

The AGC signal application circuitry 03 is responsive to an AGC signal selected by a multiplexer 39 to exert further control of gain in this cascade connection of elements 2, 11, 12, 14, 15 and 17. The multiplexer 39 makes its selection of AGC signal in response to the QAM/VSB CONTROL SIGNAL supplied to the multiplexer 39 from the PN sequence presence detector 7.

In the FIG. 17 radio receiver an automatic-gain-control detector 3A generates a digital QAM automatic-gain-control (AGC) signal responsive to the I and Q baseband signals from the QAM digital synchrodyne circuitry 5. The AGC detector 3A can be a read-only memory storing a look-up table of the sum of the squares of the I and Q signals from the synchrodyne circuitry 5, for example. This digital QAM AGC signal is converted to an analog QAM AGC signal by the cascade connection of a digital-to-analog converter 3B and an analog lowpass filter 3C. Responsive to the QAM/VSB CONTROL SIGNAL indicating that VSB DTV signal is not currently being received, the multiplexer 39 relays the response of the analog lowpass filter 3C to the AGC signal application circuitry 03.

In the FIG. 17 radio receiver an automatic-gain-control detector 3D generates a digital VSB automatic-gain-control (AGC) signal responsive to the I and Q baseband signals from the VSB digital synchrodyne circuitry 6. The digital VSB AGC signal is converted to an analog VSB AGC signal by the cascade connection of a digital-to-analog converter 3E and an analog lowpass filter 3F. Responsive to the QAM/VSB CONTROL SIGNAL indicating that VSB DTV signal is currently being received, the multiplexer 39 relays the response of the analog lowpass filter 3F to the AGC signal application circuitry 03.

The AGC detector 3D can be a read-only memory storing a look-up table of the sum of the squares of the I and Q signals from the synchrodyne circuitry 6, for example. The look-up tables in ROM can be modified to take into account the direct component accompanying the I signal output from the synchrodyne circuitry 6, to adjust the squaring of the signal based on the likeliest value of the direct component. Using an alternative approach, the generation of digital VSB AGC signal can be simplified by squaring just the Q signal output from the synchrodyne circuitry 6. Alternatively, an averaging filter responsive to the I signal output from the synchrodyne circuitry 6 can separate the direct component arising from synchronous detection of the pilot carrier for use as the digital VSB AGC signal supplied to the DAC 3E as its input signal.

Figure 18:
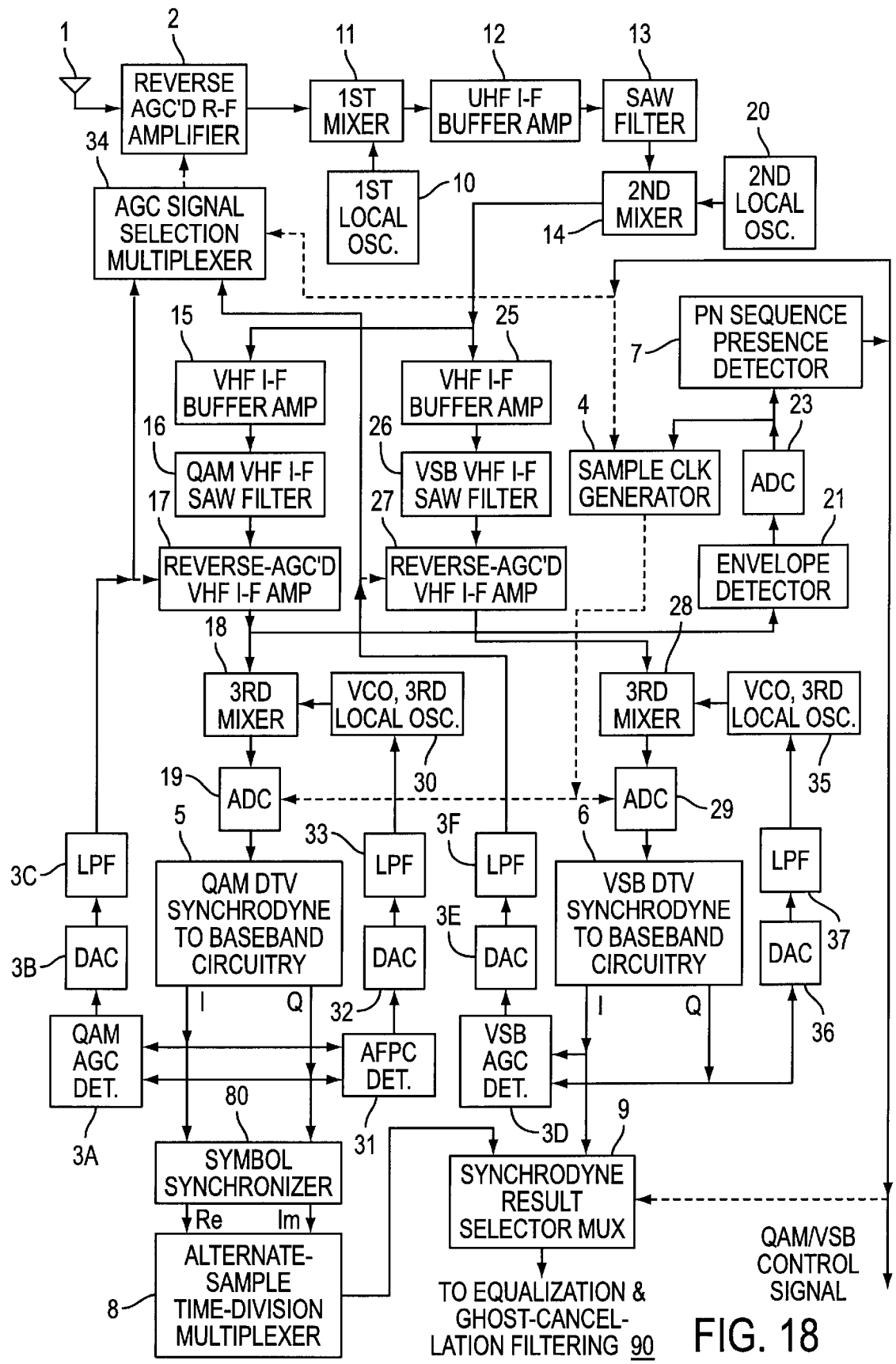
FIGS. 18 and 19 are block schematic diagrams of the radio receiver portions of still other types of DTV receiver embodying the invention.

FIG. 18 shows radio receiver portions used in still another type of QAM/VSB DTV signal receiver embodying the invention, which radio receiver portions differ somewhat from those of FIG. 1 or those of FIG. 17. The FIG. 18 radio receiver relies on the responses of different SAW filters 16 and 26 for QAM reception and for VSB reception. The second mixer 14 output signal is applied to the SAW filters 16 and 26 via VHF I-F buffer amplifiers 15 and 25, respectively. The response from the SAW filter 16 is supplied as input signal to the reverse-AGC'd VHF I-F amplifier 17, the response from which amplifier 17 is supplied to the third mixer 18 for downconversion to final I-F signal prior to digitization by ADC 19. The response from the SAW filter 26 is supplied as input signal to the reverse-AGC'd VHF I-F amplifier 27, the response from which amplifier 27 is supplied to the third mixer 28 for downconversion to final I-F signal prior to digitization by ADC 29.

As in the FIG. 17 radio receiver, in the FIG. 18 radio receiver the automatic-gain-control detector 3A generates a digital QAM automatic-gain-control (AGC) signal responsive to the I and Q baseband signals from the QAM digital synchrodyne circuitry 5; and this digital QAM AGC signal is converted to an analog QAM AGC signal by the cascade connection of a digital-to-analog converter 3B and an analog lowpass filter 3C. Also, as in the FIG. 17 radio receiver, in the FIG. 18 radio receiver the automatic-gain-control detector 3D generates a digital VSB automatic-gain-control (AGC) signal responsive to the I and Q baseband signals from the VSB digital synchrodyne circuitry 6; and this digital VSB AGC signal is converted to an analog VSB AGC signal by the cascade connection of a digital-to-analog converter 3E and an analog lowpass filter 3F. In the FIG. 18 radio receiver the analog QAM AGC signal is applied directly to the reverse-AGC'd VHF I-F amplifier 17, and the analog VSB AGC signal is applied directly to the reverse-AGC'd VHF I-F amplifier 27. The multiplexer 39 is not included in the FIG. 18 radio receiver. In accordance with an aspect of the invention, another AGC signal selection multiplexer 34 that is controlled by QAM/VSB CONTROL SIGNAL from the PN sequence presence detector 7 is included in the FIG. 18 radio receiver for selecting whether the analog QAM AGC signal or the analog VSB AGC signal is supplied to the reversed-AGC'd R-F amplifier 2 for developing a delayed-AGC signal therefrom. Responsive to the QAM/VSB CONTROL SIGNAL indicating that VSB DTV signal is not currently being received, the multiplexer 34 relays the analog QAM AGC signal response of the analog lowpass filter 3C to the R-F amplifier 2 for developing a delayed-AGC signal therein. Responsive to the QAM/VSB CONTROL SIGNAL indicating that VSB DTV signal is currently being received, the multiplexer 34 relays the analog VSB AGC signal response of the analog lowpass filter 3F to the R-F amplifier 2 for developing a delayed-AGC signal therein.

Figure 19:
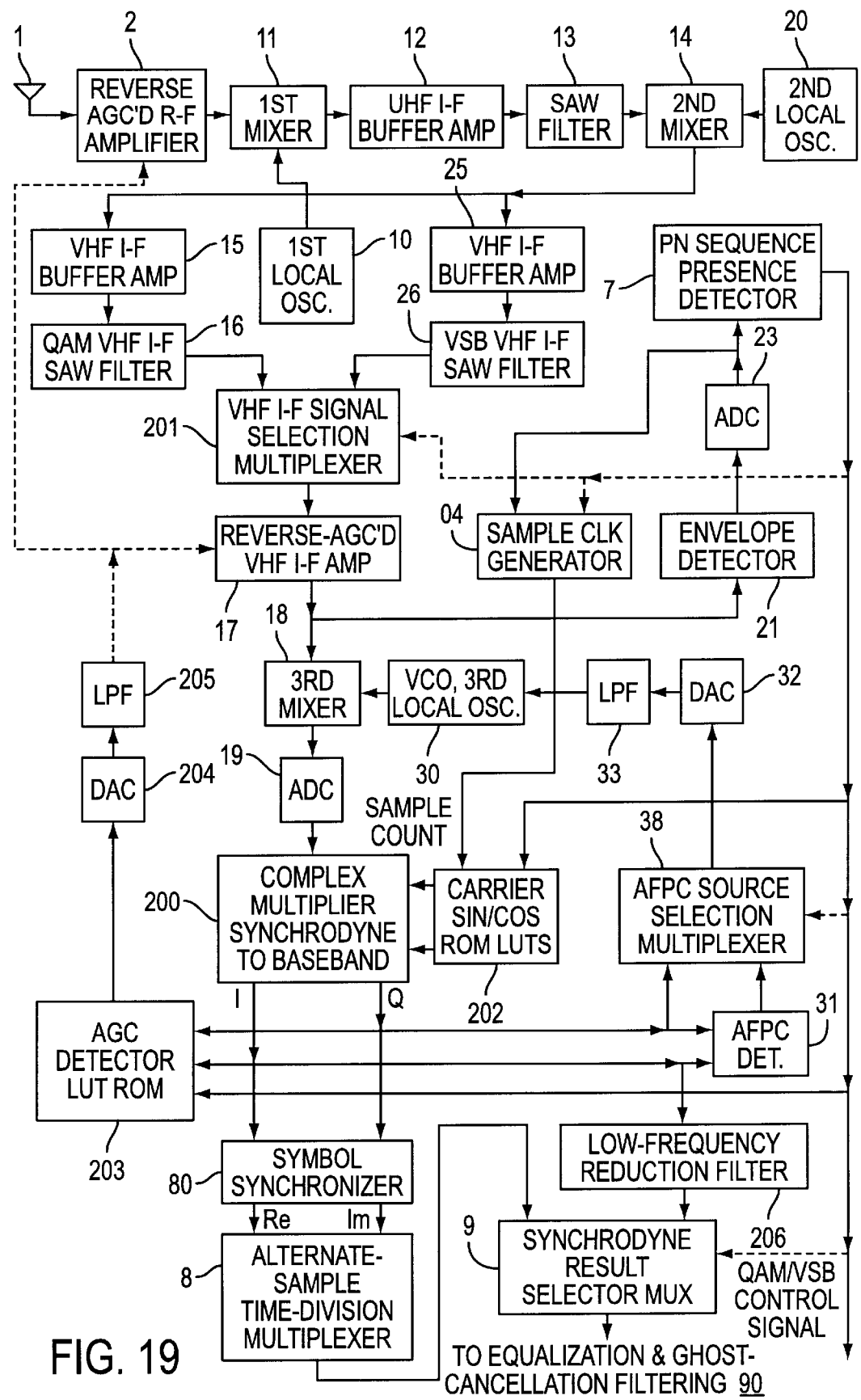

FIG. 19 shows a DTV signal receiver that differs from those described above in that a single complex digital multiplier 200 is used both for synchrodyning QAM DTV signals to baseband and for synchrodyning VSB DTV signals to baseband. Like the FIG. 18 radio receiver the FIG. 19 radio receiver relies on the responses of different SAW filters 16 and 26 for QAM reception and for VSB reception. However, the FIG. 19 radio receiver uses a VHF I-F signal selection multiplexer 201 for selecting one of the responses of the SAW filters 16 and 26 for application to the reverse-AGC'd VHF I-F amplifier 17, thereby avoiding the need for elements 27, 28, 29, 35, 36 and 37 for processing SAW filter 26 response. In accordance with an aspect of the invention the QAM/VSB CONTROL SIGNAL supplied by the PN sequence presence detector 7 is used by the VHF I-F signal selection multiplexer 201 as a control signal for determining whether the SAW filter 16 response or the SAW filter 26 response is supplied to the reverse-AGC'd VHF I-F amplifier 17 as its input signal. Responsive to the QAM/VSB CONTROL SIGNAL indicating that VSB DTV signal is not currently being received, the multiplexer 201 applies input signal to the reverse-AGC'd VHF I-F amplifier 17 corresponding to the SAW filter 16 response. Responsive to the QAM/VSB CONTROL SIGNAL indicating that VSB DTV signal is currently being received, the multiplexer 201 applies input signal to the reverse-AGC'd VHF I-F amplifier 17 corresponding to the SAW filter 26 response.

The response of the VHF I-F amplifier 17 is downconverted in the third mixer 18, and the downconversion result is digitized by the ADC 19 to be used as a real component of multiplicand signal by the complex digital multiplier 200. The AFPC of the third local oscillator 30 used for the downconversion in the third mixer 18 permits the complex digital multiplier 200 to be constructed using only two component digital multipliers without requirement for an imaginary component of multiplicand signal. This saves having to have circuitry for obtaining the Hilbert transform of the digitized final I-F signal to serve as the imaginary component of multiplicand signal.

Arrangements for AFPC of the third local oscillator 30 in the FIG. 19 radio receiver are similar to those in the FIG. 17 radio receiver. Responsive to the QAM/VSB CONTROL SIGNAL indicating that VSB DTV signal is currently being received, the multiplexer 38 applies the quadrature-phase (Q) baseband signal from the complex multiplier 200 to the DAC 32 as its input signal. During reception of QAM DTV signal the quadrature-phase (Q) baseband signal from the complex multiplier 200 corresponds to that from the QAM synchrodyne circuitry 5 in the FIG. 17 radio receiver. In the FIG. 19 radio receiver, responsive to the QAM/VSB CONTROL SIGNAL indicating that VSB DTV signal is not currently being received, the multiplexer 38 applies the response of the AFPC detector 31 to the DAC 32 as its input signal. In the FIG. 19 radio receiver the AFPC detector 31 receives the in-phase (I) and quadrature-phase (Q) baseband signals from the complex multiplier 200 as its input signals. During reception of VSB DTV signal the I and Q baseband signals from the complex multiplier 200 correspond to those from the VSB synchrodyne circuitry 6 in the FIG. 17 radio receiver.

The complex digital carrier the complex digital multiplier 200 uses as multiplier signal is read from read-only memory 202. The read-only memory 202 stores sine and cosine look-up tables both for QAM DTV digital carrier signal as translated to final I-F band and for VSB DTV digital carrier signal as translated to final I-F band. The sample clock generator 4 that includes two sample counters 48 and 49 is replaced by a sample clock generator 04 similar to sample clock generator 4 except for having just a single sample counter therein. This single sample counter (not explicitly shown in FIG. 19) counts the samples generated by the sample clock generator 04 to provide a portion of the addressing of the sine and cosine look-up tables stored in the ROM 202. The QAM/VSB reception control signal supplied by the PN sequence presence detector 7 is applied as a further bit in the addressing of the ROM 202 and selects for reading either the sine and cosine look-up tables for QAM DTV digital carrier signal as translated to final I-F band or the sine and cosine look-up tables for VSB DTV digital carrier signal as translated to final I-F band.

The FIG. 19 radio receiver includes an automatic-gain-control detector 203 that is implemented in read-only memory (ROM) which receives the in-phase (I) and quadrature-phase (Q) baseband signals from the complex multiplier 200 as address bits for look-up tables (LUTs) of AGC detection results. In accordance with an aspect of the invention the QAM/VSB reception control signal supplied by the PN sequence presence detector 7 is applied to the AGC detector LUT ROM 203 as a further one of its address bits. During QAM reception the AGC detector LUT ROM 203 generates a digital QAM automatic-gain-control (AGC) signal responsive to the I and Q baseband signals from the complex multiplier 200; and this digital QAM AGC signal is converted to an analog QAM AGC signal by the cascade connection of a digital-to-analog converter 204 and an analog lowpass filter 205. The contents in those portions of the look-up tables in ROM 203 that are addressed during QAM reception corresponds to the contents of the look-up tables that would be used in ROM implementation of the QAM AGC detector 3A in the FIG. 17 radio receiver. During VSB reception the AGC detector LUT ROM 203 generates a digital VSB automatic-gain-control (AGC) signal responsive to the in-phase (I) and quadrature-phase (Q) baseband signals from the complex multiplier 200; and this digital VSB AGC signal is converted to an analog VSB AGC signal by the cascade connection of the DAC 204 and the analog lowpass filter 205. The contents of the portions of the look-up tables in ROM 203 that are addressed during VSB reception corresponds to the contents of the look-up tables that would be used in ROM implementation of the VSB AGC detector 3D in the FIG. 17 radio receiver. The analog lowpass filter 205 response is supplied to the reversed-AGC'd R-F amplifier 2 for developing a delayed-AGC signal therein, as well as being supplied to the reverse-AGC'd VHF I-F amplifier 17 as its AGC signal.

The real and imaginary signal responses of the symbol synchronizer 80 to in-phase (I) and quadrature-phase (Q) baseband signals from the complex multiplier 200 are time-division multiplexed on an alternate-sample basis by the multiplexer 8.

During QAM DTV reception the QAM/VSB reception control signal from the PN sequence presence detector 7 indicates no VSB DTV signal reception. The synchrodyne result selector multiplexer 9 responds to this indication to reproduce the output signal from the multiplexer 8 in its own output signal supplied as input signal to the equalization and ghost-cancellation filtering 90.

During VSB reception the QAM/VSB reception control signal from the PN sequence presence detector 7 indicates VSB DTV signal reception. The digitized final I-F signal supplied to the complex multiplier 200 is responsive to the band-shaping by the SAW filter 26, which preferably boosts channel gain in the frequency range surrounding carrier. This boosting is done so as to provide a symmetrical sideband structure near pilot carrier frequency that makes quadrature-phase synchronous detection less sensitive to VSB modulation of the suppressed data carrier, to improve operation of the AFPC loop for VCO 30. This boosting can be compensated for in the equalization and ghost-cancellation filtering 90.

FIG. 19 shows the in-phase (I) baseband signal from the complex multiplier 200 being supplied to a low-frequency reduction filter 206 used to compensate for channel gain having been boosted in the frequency range surrounding carrier, rather than compensation being done in the equalization and ghost-cancellation filtering 90. The filter 206 is a finite-impulse-response (FIR) digital lowpass filter that rolls off low frequencies to compensate for the SAW filter 26 boosting channel gain in the frequency range surrounding carrier. During VSB reception the synchrodyne result selector multiplexer 9 responds to QAM/VSB reception control signal indicating VSB DTV signal reception to reproduce the filter 206 response in its own output signal supplied as input signal to the equalization and ghost-cancellation filtering 90.

The term "television signal radio receiver" as used in the following claims is intended to apply not only to such receivers as used in connection with a television display device, but also to such receivers as otherwise used—for example, in a digital video cassette recorder —or, by way of further example, in apparatus for converting DTV signals to NTSC signals.

What is claimed is:

1. A television signal radio receiver for selectively receiving vestigial-sideband (VSB) digital television (DTV) signals and television signals of at least one other type, each said VSB DTV signal having pseudo-random noise (PN) sequence information in the initial data segment of each successive one of the data fields thereof, said television signal radio receiver comprising:

a tuner for supplying analog intermediate-frequency carrier modulated in accordance with a selected one of said television signals, said modulated analog intermediate-frequency carrier having an envelope exhibiting amplitude variations in response to said pseudo random sequences and to said symbol codes;

an envelope detector for detecting the amplitude of said envelope amplitude variations to supply an envelope detector response;

a PN sequence presence detector responsive to said envelope detector response for detecting the occurrence of said PN sequence information therein when a VSB DTV signal is being received, said PN sequence presence detector providing an output signal with an indication of each such occurrence which indication is sustained for a period of time at least as long as the duration of a data field; and circuitry, for operating the television signal radio receiver in a VSB DTV reception mode responsive to said PN sequence presence detector providing an output signal with an indication of the occurrence of said PN sequence information in said baseband signal, and for operating the television signal radio receiver in a reception mode for another type of television signal responsive to said PN sequence presence detector providing an output signal without indication of the occurrence of said PN sequence information in said baseband signal.

2. The television signal radio receiver of claim 1, wherein said PN sequence presence detector comprises:

match filter circuitry receptive of said baseband signal for providing match filter response to pseudo-random noise (PN) sequence information in the data field synchronization segment of a VSB DTV baseband signal;

a threshold detector for determining when the response of said match filter circuitry is of sufficient energy to provide a pulse indication of an occurrence in said first baseband signal of the PN sequence information in the data field synchronization segment of a received VSB DTV transmission; and timed latch circuitry for latching the indication for a period of time longer than at least one DTV data field, thereby to generate the output signal of said PN sequence presence detector.

3. The television signal radio receiver of claim 2, wherein said match filter circuitry is of a type responsive to PN511 sequence information.

4. The television signal radio receiver of claim 2, wherein said match filter circuitry is of a type responsive to PN63 sequence information.

5. The television signal radio receiver of claim 2, wherein said match filter circuitry is of a type responsive to PN sequence information comprising two PN63 sequences with prescribed differential time delay therebetween.

6. The television signal radio receiver of claim 5, wherein said prescribed differential time delay is equal to the duration of each of said two PN63 sequences.

7. The television signal radio receiver of claim 2, wherein said match filter circuitry is of a type responsive to triple PN63 sequence information.

8. The television signal radio receiver of claim 2, wherein said timed latch circuitry comprises:

an AND gate having an output connection for selectively passing clock signals applied to a first input connection of said AND gate responsive to a gating signal applied to a second input connection of said AND gate;

a counter with capability for supplying from an output port thereof a number an output count of said clock signals as occur in a time longer than the duration of a data field before reaching a final count, said counter receiving at a count input port said clock signals selectively passed from the output connection of said AND gate, said counter having a reset connection for receiving each said pulse indication from said threshold detector, the count supplied from the output port of said counter being reset to an initial value responsive to each said pulse indication received from said threshold detector;

a decoder for detecting the count supplied from the output port of said counter reaching said final count to generate a logic ONE at an output connection of said decoder and otherwise generating a logic ZERO at the output connection of said decoder; and a logic inverter with an input connection from the output connection of said decoder and with an output connection for supplying said gating signal to the second input connection of said AND gate, the output signal of said timed latch circuitry being taken from at least one of the input and output connections of said logic inverter.

9. The television signal radio receiver of claim 1, wherein said one other type of television signals are quadrature-amplitude-modulation (QAM) digital television (DTV) signals, and wherein said circuitry for operating the television signal radio receiver in a VSB DTV reception mode responsive to said PN sequence presence detector providing an output signal with an indication of the occurrence of said PN sequence information in said baseband signal, and for operating the television signal radio receiver in a reception mode for another type of television signal responsive to said PN sequence presence detector providing an output signal without indication of the occurrence of said PN sequence information in said baseband signal, comprises:

a first controlled oscillator for generating first local oscillations;

a second controlled oscillator for generating second local oscillations;

a mixer for mixing said first local oscillations with said analog intermediate-frequency carrier modulated in accordance with a selected one of said vestigial-sideband digital television signals, thereby to generate a first final-intermediate-frequency signal;

another mixer for mixing said second local oscillations with said analog intermediate-frequency carrier modulated in accordance with a selected one of said vestigial-sideband digital television signals, thereby to generate a second final-intermediate-frequency signal;

circuitry for synchrodyning QAM DTV signal in said first final-intermediate-frequency signal to baseband for recovering a first in-phase baseband signal and a first quadrature-phase baseband signal;

a symbol synchronizer for generating a real QAM baseband signal and an imaginary QAM baseband signal in response to said first in-phase baseband signal and said first quadrature-phase baseband signal;

a time-division multiplexer for time interleaving samples of said real QAM baseband signal and said imaginary QAM baseband signal on an alternate-sample basis to generate a time-division multiplexer output signal;

circuitry for synchrodyning VSB DTV signal in said second final-intermediate-frequency signal to baseband for recovering a second in-phase baseband signal and a second quadrature-phase baseband signal;

equalization and ghost-cancellation filtering; and a synchrodyne result selector multiplexer, responsive to said PN sequence detector not detecting the presence of PN sequences for supplying input signal to said equalization and ghost-cancellation filtering that corresponds to said time-division multiplexer output signal, and responsive to said PN sequence detector detecting the presence of PN sequences for supplying input signal to said equalization and ghost-cancellation filtering that corresponds to said second in-phase baseband signal.

10. The television signal radio receiver of claim 9, wherein said equalization and ghost-cancellation filtering is of adaptive type, conditioned for adaptation of a first type responsive to said PN sequence detector not detecting the presence of PN sequences for supplying input signal to said equalization and ghost-cancellation filtering that corresponds to said time-division multiplexer output signal, and conditioned for adaptation of a second type responsive to said PN sequence detector detecting the presence of PN sequences for supplying input signal to said equalization and ghost-cancellation filtering that corresponds to said second in-phase baseband signal.

11. The television signal radio receiver of claim 1, wherein said one other type of television signals are quadrature-amplitude-modulation (QAM) digital television (DTV) signals, and wherein said tuner includes amplifier stages subject to automatic gain control, said television signal radio receiver further comprising:

circuitry for converting to a final-intermediate-frequency signal said analog intermediate-frequency carrier modulated in accordance with a selected one of said vestigial-sideband digital television signals;

circuitry for synchrodyning QAM DTV signal in said final-intermediate-frequency signal to baseband for recovering a first in-phase baseband signal and a first quadrature-phase baseband signal;

circuitry for synchrodyning VSB DTV signal in said final-intermediate-frequency signal to baseband for recovering a second in-phase baseband signal and a second quadrature-phase baseband signal;

automatic-gain-control (AGC) signal application circuitry for applying an automatic-gain-control (AGC) signal to said amplifier stages subject to automatic gain control;

a first automatic gain control detector for generating an output signal therefrom responsive to said first in-phase baseband signal and said first quadrature-phase baseband signal;

a second automatic gain control detector for generating an output signal therefrom responsive to said second in-phase baseband signal and said second quadrature-phase baseband signal; and an automatic-gain-control (AGC) signal selection multiplexer for supplying said automatic-gain-control (AGC) signal to said AGC signal application circuitry, said AGC signal selection multiplexer being responsive to said PN sequence detector not detecting the presence of PN sequences for supplying said AGC signal in correspondence with said output signal of said first automatic gain control detector received by said AGC signal selection multiplexer as a first input signal thereof, and said AGC signal selection multiplexer being responsive to said PN sequence detector detecting the presence of PN sequences for supplying said AGC signal in correspondence with said output signal of said second automatic gain control detector received by said AGC signal selection multiplexer as a second input signal thereof.

12. The television signal radio receiver of claim 1, wherein said one other type of television signals are quadrature-amplitude-modulation (QAM) digital television (DTV) signals, and wherein said circuitry for operating the television signal radio receiver in a VSB DTV reception mode responsive to said PN sequence presence detector providing an output signal with an indication of the occurrence of said PN sequence information in said baseband signal, and for operating the television signal radio receiver in a reception mode for another type of television signal responsive to said PN sequence presence detector providing an output signal without indication of the occurrence of said PN sequence information in said baseband signal, comprises:

an automatic-frequency-and-phase-control (AFPC) source selection multiplexer for supplying an automatic frequency and phase control signal, said AFPC source selection multiplexer being responsive to said PN sequence detector not detecting the presence of PN sequences for supplying said automatic frequency and phase control signal in correspondence with a first input signal received by said AFPC source selection multiplexer, and said AFPC source selection multiplexer being responsive to said PN sequence detector detecting the presence of PN sequences for supplying said automatic frequency and phase control signal in correspondence with a second input signal received by said AFPC source selection multiplexer;

a controlled oscillator for generating local oscillations with frequency and phase controlled by said automatic frequency and phase control signal;

a mixer for mixing said local oscillations with said analog intermediate-frequency carrier modulated in accordance with a selected one of said vestigial-sideband digital television signals, thereby to generate a final-intermediate-frequency signal;

circuitry for synchrodyning QAM DTV signal in said final-intermediate-frequency signal to baseband for recovering a first in-phase baseband signal and a first quadrature-phase baseband signal;

an automatic frequency and phase detector for generating an output signal therefrom responsive to said first in-phase baseband signal and said first quadrature-phase baseband signal;

a first lowpass filter connected to respond to lower-frequency components of the output signal from said automatic frequency and phase detector for generating said first input signal received by said AFPC source selection multiplexer;

circuitry for synchrodyning VSB DTV signal in said final-intermediate-frequency signal to baseband for recovering a second in-phase baseband signal and a second quadrature-phase baseband signal; and a second lowpass filter connected to respond to lower-frequency components of said second quadrature-phase baseband signal for generating said second input signal received by said AFPC source selection multiplexer.

13. The television signal radio receiver of claim 12, further comprising:

a symbol synchronizer for generating a real QAM baseband signal and an imaginary QAM baseband signal in response to said first in-phase baseband signal and said first quadrature-phase baseband signal;

a time-division multiplexer for time interleaving samples of said real QAM baseband signal and said imaginary QAM baseband signal on an alternate-sample basis to generate a time-division multiplexer output signal;

equalization and ghost-cancellation filtering; and a synchrodyne result selector multiplexer, responsive to said PN sequence detector not detecting the presence of PN sequences for supplying input signal to said equalization and ghost-cancellation filtering that corresponds to said time-division multiplexer output signal, and responsive to said PN sequence detector detecting the presence of PN sequences for supplying input signal to said equalization and ghost-cancellation filtering that corresponds to said second in-phase baseband signal.

14. The television signal radio receiver of claim 13, wherein said equalization and ghost-cancellation filtering is of adaptive type, conditioned for adaptation of a first type responsive to said PN sequence detector not detecting the presence of PN sequences for supplying input signal to said equalization and ghost-cancellation filtering that corresponds to said time-division multiplexer output signal, and conditioned for adaptation of a second type responsive to said PN sequence detector detecting the presence of PN sequences for supplying input signal to said equalization and ghost-cancellation filtering that corresponds to said second in-phase baseband signal.

15. The television signal radio receiver of claim 13, wherein said tuner includes amplifier stages subject to automatic gain control, said television signal radio receiver further comprising:

automatic-gain-control (AGC) signal application circuitry for applying an automatic-gain-control (AGC) signal to said amplifier stages subject to automatic gain control;

a first automatic gain control detector for generating an output signal therefrom responsive to said first in-phase baseband signal and said first quadrature-phase baseband signal;

a second automatic gain control detector for generating an output signal therefrom responsive to said second in-phase baseband signal and said second quadrature-phase baseband signal; and an automatic-gain-control (AGC) signal selection multiplexer for supplying said automatic-gain-control (AGC) signal to said AGC signal application circuitry, said AGC signal selection multiplexer being responsive to said PN sequence detector not detecting the presence of PN sequences for supplying said AGC signal in correspondence with said output signal of said first automatic gain control detector received by said AGC signal selection multiplexer as a first input signal thereof, and said AGC signal selection multiplexer being responsive to said PN sequence detector detecting the presence of PN sequences for supplying said AGC signal in correspondence with said output signal of said second automatic gain control detector received by said AGC signal selection multiplexer as a second input signal thereof.

16. The television signal radio receiver of claim 15, wherein said equalization and ghost-cancellation filtering is of adaptive type, conditioned for adaptation of a first type responsive to said PN sequence detector not detecting the presence of PN sequences for supplying input signal to said equalization and ghost-cancellation filtering that corresponds to said time-division multiplexer output signal, and conditioned for adaptation of a second type responsive to said PN sequence detector detecting the presence of PN sequences for supplying input signal to said equalization and ghost-cancellation filtering that corresponds to said second in-phase baseband signal.

17. The television signal radio receiver of claim 1, wherein said one other type of television signals are quadrature-amplitude-modulation (QAM) digital television (DTV) signals, and wherein said tuner comprises:

a radio-frequency amplifier having gain controlled by delayed application of automatic gain control signal, for supplying response to received television signals applied as input signal thereto;

circuitry for converting to very-high-frequency band the response of said radio-frequency amplifier to received television signal, thereby to generate a frequency-converted television signal;

a first passband filter for supplying first passband filter response to said frequency-converted television signal, the transmission characteristic of said first passband filter designed for said frequency-converted television signal being a frequency-converted QAM DTV signal during the reception of a QAM DTV signal;

a second passband filter for supplying second passband filter response to said frequency-converted television signal, the transmission characteristic of said second passband filter designed for said frequency-converted television signal being a frequency-converted VSB DTV signal during the reception of a VSB DTV signal;

a very-high-frequency (VHF) intermediate-frequency (I-F) amplifier having gain controlled by automatic gain control signal and being responsive to a VHF I-F input signal for supplying said analog intermediate-frequency carrier modulated in accordance with a selected one of said television signals;

a VHF I-F signal selection multiplexer for supplying said VHF I-F input signal to said very-high-frequency intermediate-frequency amplifier, said VHF I-F signal selection multiplexer being responsive to said PN sequence detector not detecting the presence of PN sequences for supplying said VHF I-F input signal in correspondence with said first passband filter response received by said VHF I-F signal selection multiplexer as a first input signal thereof, and said VHF I-F signal selection multiplexer being responsive to said PN sequence detector detecting the presence of PN sequences for supplying said AGC signal in correspondence with said output signal of said second passband filter response received by said VHF I-F signal selection multiplexer as a second input signal thereof.

18. The television signal radio receiver of claim 17, further comprising:

an automatic-frequency-and-phase-control (AFPC) source selection multiplexer for supplying an automatic frequency and phase control signal, said AFPC source selection multiplexer being responsive to said PN sequence detector not detecting the presence of PN sequences for supplying said automatic frequency and phase control signal in correspondence with a first input signal received by said AFPC source selection multiplexer, and said AFPC source selection multiplexer being responsive to said PN sequence detector detecting the presence of PN sequences for supplying said automatic frequency and phase control signal in correspondence with a second input signal received by said AFPC source selection multiplexer;

a controlled oscillator for generating local oscillations with frequency and phase controlled by said automatic frequency and phase control signal;

a mixer for mixing said local oscillations with said analog intermediate-frequency carrier modulated in accordance with a selected one of said television signals, thereby to generate a final-intermediate-frequency signal;

a complex multiplier for synchrodyning said final-intermediate-frequency signal to baseband for recovering an in-phase baseband signal and a quadrature-phase baseband signal;

an automatic frequency and phase detector for generating an output signal therefrom responsive to said in-phase baseband signal and said quadrature-phase baseband signal;

a first lowpass filter connected to respond to lower-frequency components of the output signal from said automatic frequency and phase detector for generating said first input signal received by said AFPC source selection multiplexer; and a second lowpass filter connected to respond to lower-frequency components of said quadrature-phase baseband signal for generating said second input signal received by said AFPC source selection multiplexer.

19. The television signal radio receiver of claim 18, further comprising:

a symbol synchronizer for generating a real QAM baseband signal and an imaginary QAM baseband signal in response to said in-phase baseband signal and said quadrature-phase baseband signal;

a time-division multiplexer for time interleaving samples of said real QAM baseband signal and said imaginary QAM baseband signal on an alternate-sample basis to generate a time-division multiplexer output signal;

equalization and ghost-cancellation filtering; and a synchrodyne result selector multiplexer, responsive to said PN sequence detector not detecting the presence of PN sequences for supplying input signal to said equalization and ghost-cancellation filtering that corresponds to said time-division multiplexer output signal, and responsive to said PN sequence detector detecting the presence of PN sequences for supplying to said equalization and ghost-cancellation filtering an input signal determined by said in-phase baseband signal.

20. The television signal radio receiver of claim 19, wherein said equalization and ghost-cancellation filtering is of adaptive type, conditioned for adaptation of a first type responsive to said PN sequence detector not detecting the presence of PN sequences for supplying input signal to said equalization and ghost-cancellation filtering that corresponds to said time-division multiplexer output signal, and conditioned for adaptation of a second type responsive to said PN sequence detector detecting the presence of PN sequences for supplying to said equalization and ghost-cancellation filtering said input signal determined by said in-phase baseband signal.

* * * * *